(12) United States Patent
Hao et al.

(10) Patent No.: US 12,250,675 B2
(45) Date of Patent: Mar. 11, 2025

(54) UPLINK CARRIER SWITCHING FOR WIRELESS DEVICES

(71) Applicants: Qualcomm Incorporated, San Diego, CA (US); Chenxi Hao, Beijing (CN); Yiqing Cao, Beijing (CN); Bo Chen, Beijing (CN); Peter Gaal, San Diego, CA (US); Hao Xu, Beijing (CN)

(72) Inventors: Chenxi Hao, Beijing (CN); Yiqing Cao, Beijing (CN); Bo Chen, Beijing (CN); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/768,539

(22) PCT Filed: Nov. 1, 2019

(86) PCT No.: PCT/CN2019/115016
§ 371 (c)(1),
(2) Date: Apr. 13, 2022

(87) PCT Pub. No.: WO2021/081983
PCT Pub. Date: May 6, 2021

(65) Prior Publication Data
US 2022/0386337 A1    Dec. 1, 2022

(51) Int. Cl.
*H04W 72/12* (2023.01)
*H04W 72/1268* (2023.01)

(52) U.S. Cl.
CPC ............... *H04W 72/1268* (2013.01)

(58) Field of Classification Search
CPC .............................................. H04W 72/1268
See application file for complete search history.

(56) References Cited

U.S. PATENT DOCUMENTS

2014/0369242 A1* 12/2014 Ng .................. H04L 5/001
                                                              370/280
2017/0303182 A1* 10/2017 Uchino ............. H04W 16/12
(Continued)

FOREIGN PATENT DOCUMENTS

CN    105340196 A    2/2016
CN    110233714 A    9/2019
(Continued)

OTHER PUBLICATIONS

International Search Report and Written Opinion—PCT/CN2019/115016—ISA/EPO—Jul. 23, 2020.
(Continued)

*Primary Examiner* — Derrick V Rose
(74) *Attorney, Agent, or Firm* — Holland & Hart LLP/Qualcomm

(57) ABSTRACT

Methods, systems, and devices for wireless communications are described. In some cases, a user equipment (UE) may In support multiple component carriers that may be used to transmit uplink transmissions. One carrier may be used at a time such that the may switch between the carriers based on an uplink transmission schedule. In some cases, switching may be limited by a consecutive uplink switching rule or UE capability. In some cases, the gap between two consecutive uplink carrier switching operations may be limited to a resource (e.g., slot, symbol), such that the UE may expect to perform at most one switching operation per resource. In some implementations, the gap between two consecutive uplink carrier switching operations may be limited to a duration (e. g., 14 symbols, 4 symbols), such that the UE may expect to perform at most one switching operation per a duration less than or equal to a threshold.

31 Claims, 17 Drawing Sheets

(56) References Cited

U.S. PATENT DOCUMENTS

2017/0332370 A1 11/2017 Rico Alvarino et al.
2020/0154496 A1 5/2020 Yi
2022/0329380 A1* 10/2022 Takada .................. H04L 5/0091

FOREIGN PATENT DOCUMENTS

EP            2996418 A1    3/2016
WO    WO-2018082990 A1    5/2018

OTHER PUBLICATIONS

3GPP TS 38.214: "3rd Generation Partnership Project, Technical Specification Group Radio Access Network, NR, Physical Layer Procedures for Data (Release 15)", 3rd Generation Partnership Project, Mobile Competence Centre, 650, Route Des Lucioles, F-06921 Sophia-Antipolis Cedex, France, vol. RAN WG1, No. V15.7.0, Sep. 28, 2019, XP055811648, pp. 1-106, XP051785090, Sec. 5.1.2.1, p. 11, Sec. 5.1.5, p. 28-29 section 5.2.1.5.1, Sec. 1, Sec. 6.2.1.3, p. 42-44, section 5.2.1.5.2, tables 5.2.1.5.2-2, Sec. 5.1.5.
Huawei., et al., "On Intra-Band NC UL CA for FR2", 3GPP TSG-RAN WG4 Meeting #92bis, R4-1912401, On Intra-band NC UL CA for FR2, 3rd Generation Partnership Project (3GPP), Mobile Competence Centre, 650, Route Des Lucioles, F-06921 Sophia-Antipolis Cedex, France, vol. RAN WG4, No. Chongqing, China, Oct. 14, 2019-Oct. 18, 2019 Oct. 4, 2019, XP051807127, 4 Pages.
Nokia., et al., "Switching Period Between Case 1 and Case 2 for Two NR FR1 Carriers", 3GPP TSG-RAN WG4 Meeting #92bis, R4-1911645, Switching Times for Nr FR1 Carrier Switching, 3rd Generation Partnership Project (3GPP), Mobile Competence Centre, 650, Route Des Lucioles, F-06921 Sophia-Antipolis Cedex, FR, vol. RAN WG4, No. Chongqing, China, Oct. 14, 2019-Oct. 18, 2019, Oct. 4, 2019, XP051806400, 5 Pages.
Supplementary European Search Report—EP19951100—Search Authority—The Hague—Jun. 1, 2023.

* cited by examiner

UPLINK CARRIER SWITCHING FOR WIRELESS DEVICES

CROSS REFERENCE

The present Application is a 371 national stage filing of International PCT Application No. PCT/CN2019/115016 by Hao et al., entitled "UPLINK CARRIER SWITCHING FOR WIRELESS DEVICES," filed Nov. 1, 2019, which is assigned to the assignee hereof, and which is expressly incorporated by reference in its entirety herein.

FIELD OF TECHNOLOGY

The following relates generally to wireless communications and more specifically to uplink carrier switching for wireless devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink carrier switching for wireless devices. Generally, the described techniques provide for a component carrier switching rule that may be applied during a carrier aggregation operation that may use multiple different component carriers. For example, some systems (e.g., 5G New Radio (NR)) may support a time domain multiplexed (TDM) uplink carrier such that a UE may transmit on more than one component carrier in carrier aggregation. The component carriers may operate at different frequency bands, operate using different techniques, or a combination thereof. To support two component carriers, such as a first and second component carrier that may be different, a UE may have two transmission chains where one of the chains may support a first component carrier and the other transmission chain may support the first component carrier and a second component carrier. A UE may switch between the first and second component carriers according to an uplink transmission schedule the UE receives from a base station. To switch between the first and second component carriers of the same transmit chain, the UE may retune the components of the transmit chain to the components associated with the component carrier supporting the next uplink transmission. A switching duration may be associated with switching between components of the first component carrier and components of the second component carrier, or vice versa. In some cases, high power consumption may result at a UE if switching between component carriers occurs frequently.

To mitigate power consumption at a UE, the time between switching operations may be restricted. In some cases, the gap between two consecutive uplink carrier switching operations may be limited to a resource (e.g., slot, symbol), such that the UE may expect to perform at most one switching operation per resource. In some implementations, the gap between two consecutive uplink carrier switching operations may be limited to a duration, such that the UE may expect to perform at most one switching operation per a duration less than or equal to a threshold. Implementing restrictions on uplink carrier component switching may reduce power consumption and mitigate the risk of a UE over-heating.

A method of wireless communication at a UE is described. The method may include determining a first uplink communication to be transmitted on a first uplink carrier, determining, after the first uplink communication, a second uplink communication to be transmitted on a second uplink carrier, determining, after the second uplink communication, a third uplink communication to be transmitted on a third uplink carrier, where a timing relationship between the first uplink communication and the third uplink communication is in accordance with a consecutive uplink switching rule or a UE capability, and transmitting at least one of the first, second, or third uplink communications, or a combination thereof based on the determinations.

An apparatus for wireless communication at a UE is described. The apparatus may include a processor, memory coupled with the processor, and instructions stored in the memory. The instructions may be executable by the processor to cause the apparatus to determine a first uplink communication to be transmitted on a first uplink carrier, determine, after the first uplink communication, a second uplink communication to be transmitted on a second uplink carrier, determine, after the second uplink communication, a third uplink communication to be transmitted on a third uplink carrier, where a timing relationship between the first uplink communication and the third uplink communication is in accordance with a consecutive uplink switching rule or a UE capability, and transmit at least one of the first, second, or third uplink communications, or a combination thereof based on the determinations.

Another apparatus for wireless communication at a UE is described. The apparatus may include means for determining a first uplink communication to be transmitted on a first uplink carrier, determining, after the first uplink communication, a second uplink communication to be transmitted on a second uplink carrier, determining, after the second uplink communication, a third uplink communication to be transmitted on a third uplink carrier, where a timing relationship between the first uplink communication and the third uplink communication is in accordance with a consecutive uplink switching rule or a UE capability, and transmitting at least one of the first, second, or third uplink communications, or a combination thereof based on the determinations.

A non-transitory computer-readable medium storing code for wireless communication at a UE is described. The code may include instructions executable by a processor to determine a first uplink communication to be transmitted on a first uplink carrier, determine, after the first uplink communication, a second uplink communication to be transmitted on a second uplink carrier, determine, after the second uplink communication, a third uplink communication to be transmitted on a third uplink carrier, where a timing relationship between the first uplink communication and the third uplink communication is in accordance with a consecutive uplink switching rule or a UE capability, and transmit at least one of the first, second, or third uplink communications, or a combination thereof based on the determinations.

Some examples of the method, apparatuses, and non-transitory computer-readable medium described herein may further include operations, features, means, or instructions for identifying that the consecutive uplink switching rule limits a number of consecutive uplink switches that occur within a slot of the first uplink carrier, the second uplink carrier, or the third uplink carrier based on a numerology associated with a respective uplink carrier.

In some examples of the method, apparatuses, and non-transitory computer-readable medium described herein, the number of consecutive uplink switches within the slot allowed by the consecutive uplink switching rule may be one.

In some examples of the method, apparatuses, and non-transitory computer-readable medium described herein, the consecutive uplink switching rule includes an exception consecutive uplink switching pertaining to transmission of a sounding reference signal communication.

Some examples of the method, apparatuses, and non-transitory computer-readable medium described herein may further include operations, features, means, or instructions for identifying that the consecutive uplink switching rule provides a minimum gap between the first uplink communication and the third uplink communication.

In some examples of the method, apparatuses, and non-transitory computer-readable medium described herein, the minimum gap between the first uplink communication and the third uplink communication may be dependent on channel type.

In some examples of the method, apparatuses, and non-transitory computer-readable medium described herein, the channel type may be associated with the first uplink communication, the second uplink communication, or the third uplink communication.

In some examples of the method, apparatuses, and non-transitory computer-readable medium described herein, the minimum gap corresponds to a first gap when the second uplink communication includes a sounding reference signal, and the minimum gap corresponds to a second gap when the second uplink communication includes signal other than the sounding reference signal.

In some examples of the method, apparatuses, and non-transitory computer-readable medium described herein, the first gap may be less than the second gap.

In some examples of the method, apparatuses, and non-transitory computer-readable medium described herein, the first gap or the second gap may be based on a predefined gap configuration, a capability of the UE, a configuration from the base station, or any combination thereof.

In some examples of the method, apparatuses, and non-transitory computer-readable medium described herein, the minimum gap between the first uplink communication and the third uplink communication may be associated with symbols between an end of the first uplink communication and a beginning of the third uplink communication.

Some examples of the method, apparatuses, and non-transitory computer-readable medium described herein may further include operations, features, means, or instructions for identifying that the UE may be configured for time division multiplexed uplink carrier aggregation such that the UE switches between two or more uplink carriers for uplink communications.

In some examples of the method, apparatuses, and non-transitory computer-readable medium described herein, the first uplink carrier and the third uplink carrier may be a same carrier.

Some examples of the method, apparatuses, and non-transitory computer-readable medium described herein may further include operations, features, means, or instructions for transmitting, to a base station, a consecutive uplink switching capability of the UE, where the consecutive uplink switching capability may be the UE capability, and receiving a scheduling configuration for the first uplink communication, the second uplink communication, and the third uplink communication that may be in accordance with the consecutive uplink switching capability.

In some examples of the method, apparatuses, and non-transitory computer-readable medium described herein, the consecutive uplink switching rule provides a minimum gap between the first uplink communication and the third uplink communication based on the consecutive uplink switching capability.

A method of wireless communications at a base station is described. The method may include determining a first uplink communication to be transmitted on a first uplink carrier from a UE, determining, after the first uplink communication, a second uplink communication to be transmitted on a second uplink carrier, determining, after the second uplink communication, a third uplink communication to be transmitted on a third uplink carrier, where a timing relationship between the first uplink communication and the third uplink communication is in accordance with a consecutive uplink switching rule or a UE capability, transmitting a scheduling configuration to the UE for at least one of the first, second, or third uplink communications based on the determinations, and receiving at least one of the first, second, or third uplink communications based on the scheduling configuration.

An apparatus for wireless communications at a base station is described. The apparatus may include a processor, memory coupled with the processor, and instructions stored in the memory. The instructions may be executable by the processor to cause the apparatus to determine a first uplink communication to be transmitted on a first uplink carrier from a UE, determine, after the first uplink communication, a second uplink communication to be transmitted on a second uplink carrier, determine, after the second uplink communication, a third uplink communication to be transmitted on a third uplink carrier, where a timing relationship between the first uplink communication and the third uplink communication is in accordance with a consecutive uplink switching rule or a UE capability, transmit a scheduling configuration to the UE for at least one of the first, second, or third uplink communications based on the determinations, and receive at least one of the first, second, or third uplink communications based on the scheduling configuration.

Another apparatus for wireless communications at a base station is described. The apparatus may include means for determining a first uplink communication to be transmitted on a first uplink carrier from a UE, determining, after the first uplink communication, a second uplink communication to be transmitted on a second uplink carrier, determining, after the second uplink communication, a third uplink communication to be transmitted on a third uplink carrier, where a timing relationship between the first uplink communication and the third uplink communication is in accordance with a consecutive uplink switching rule or a UE capability, transmitting a scheduling configuration to the UE for at least one of the first, second, or third uplink communications based on the determinations, and receiving at least one of the first, second, or third uplink communications based on the scheduling configuration.

A non-transitory computer-readable medium storing code for wireless communications at a base station is described. The code may include instructions executable by a processor to determine a first uplink communication to be transmitted on a first uplink carrier from a UE, determine, after the first uplink communication, a second uplink communication to be transmitted on a second uplink carrier, determine, after the second uplink communication, a third uplink communication to be transmitted on a third uplink carrier, where a timing relationship between the first uplink communication and the third uplink communication is in accordance with a consecutive uplink switching rule or a UE capability, transmit a scheduling configuration to the UE for at least one of the first, second, or third uplink communications based on the determinations, and receive at least one of the first, second, or third uplink communications based on the scheduling configuration.

Some examples of the method, apparatuses, and non-transitory computer-readable medium described herein may further include operations, features, means, or instructions for identifying that the consecutive uplink switching rule limits a number of consecutive uplink switches that occur within a slot of the first uplink carrier, the second uplink carrier, or the third uplink carrier based on a numerology associated with a respective uplink carrier.

In some examples of the method, apparatuses, and non-transitory computer-readable medium described herein, the number of consecutive uplink switches within the slot allowed by the consecutive uplink switching rule may be one.

In some examples of the method, apparatuses, and non-transitory computer-readable medium described herein, the consecutive uplink switching rule includes an exception consecutive uplink switching pertaining to transmission of a sounding reference signal communication.

Some examples of the method, apparatuses, and non-transitory computer-readable medium described herein may further include operations, features, means, or instructions for identifying that the consecutive uplink switching rule provides a minimum gap between the first uplink communication and the third uplink communication.

In some examples of the method, apparatuses, and non-transitory computer-readable medium described herein, the minimum gap between the first uplink communication and the third uplink communication may be dependent on channel type.

In some examples of the method, apparatuses, and non-transitory computer-readable medium described herein, the channel type may be associated with the first uplink communication, the second uplink communication, or the third uplink communication.

In some examples of the method, apparatuses, and non-transitory computer-readable medium described herein, the minimum gap corresponds to a first gap when the second uplink communication includes a sounding reference signal, and the minimum gap corresponds to a second gap when the second uplink communication includes signal other than the sounding reference signal.

In some examples of the method, apparatuses, and non-transitory computer-readable medium described herein, the first gap may be less than the second gap.

In some examples of the method, apparatuses, and non-transitory computer-readable medium described herein, the first gap or the second gap may be based on a predefined gap configuration, a capability of the UE signaled by the UE, a configuration from the base station, or any combination thereof.

In some examples of the method, apparatuses, and non-transitory computer-readable medium described herein, the minimum gap between the first uplink communication and the third uplink communication may be associated with symbols between an end of the first uplink communication and a beginning of the third uplink communication.

In some examples of the method, apparatuses, and non-transitory computer-readable medium described herein, the minimum number of symbols between the first uplink communication and the third uplink communication may be associated with symbols between an end of the first uplink communication and a beginning of the third uplink communication.

Some examples of the method, apparatuses, and non-transitory computer-readable medium described herein may further include operations, features, means, or instructions for configuring a UE for time division multiplexed uplink carrier aggregation such that the UE switches between an uplink frequency division duplex carrier and a time division duplex carrier for uplink communications.

In some examples of the method, apparatuses, and non-transitory computer-readable medium described herein, the first uplink carrier and the third uplink carrier may be a same carrier.

Some examples of the method, apparatuses, and non-transitory computer-readable medium described herein may further include operations, features, means, or instructions for receiving, from the UE, a consecutive uplink switching capability of the UE, where the consecutive uplink switching capability may be the UE capability, and scheduling the first uplink communication, the second uplink communication, and the third uplink communication in accordance with the consecutive uplink switching capability.

In some examples of the method, apparatuses, and non-transitory computer-readable medium described herein, the consecutive uplink switching rule provides a minimum gap between the first uplink communication and the third uplink communication based on the consecutive uplink switching capability.

Some examples of the method, apparatuses, and non-transitory computer-readable medium described herein may further include operations, features, means, or instructions for transmitting an indication of the consecutive uplink switching rule to the UE.

DETAILED DESCRIPTION

Figure 1:
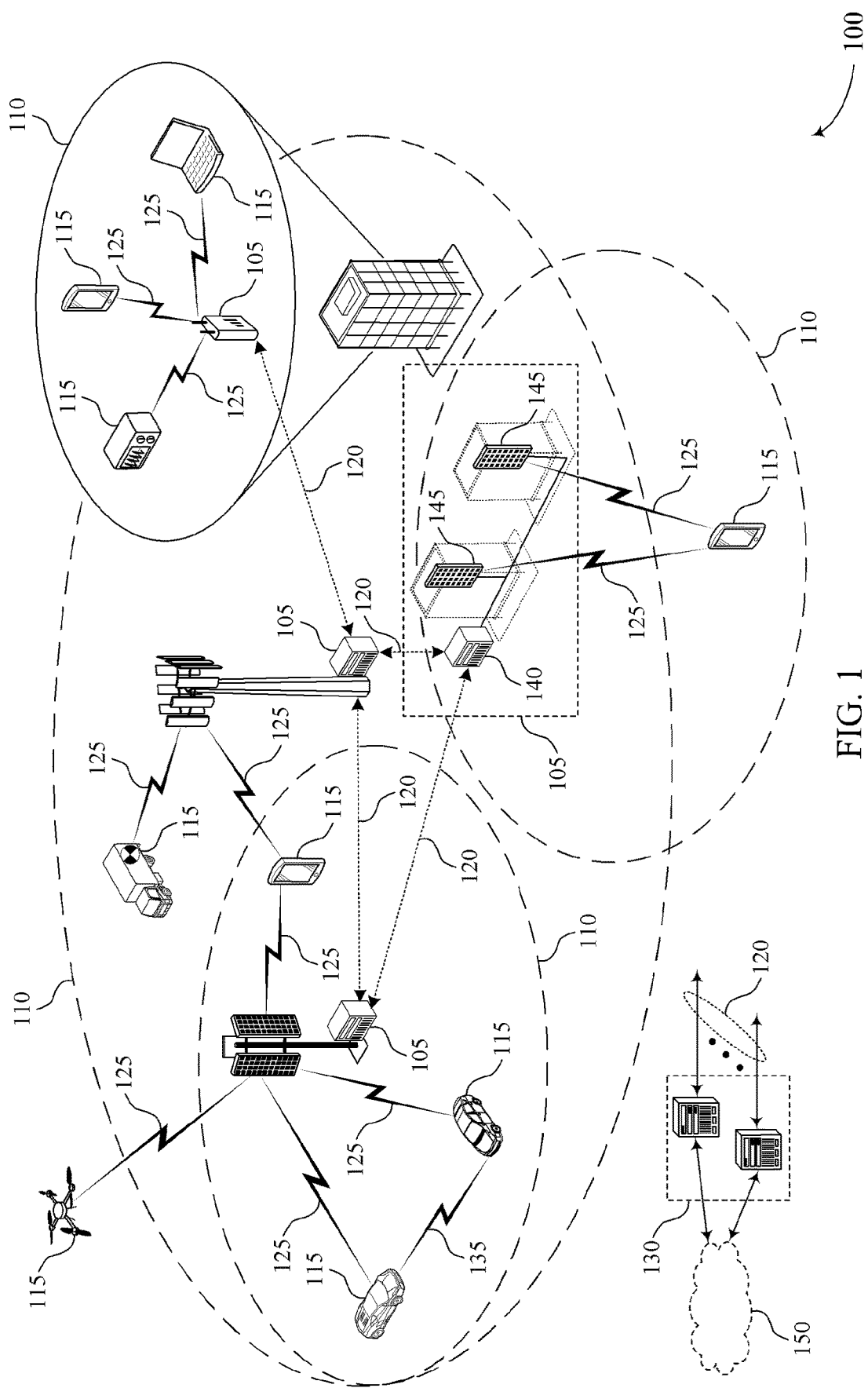
FIG. 1 illustrates an example of a wireless communications system that supports uplink carrier switching for wireless devices in accordance with aspects of the present disclosure.

In some systems (e.g., 5G New Radio (NR)), a high frequency band (e.g., 3.5 GHz) may be used to transmit uplink and downlink transmissions. In some cases, propagation loss of signals transmitted at these high frequency bands may occur due to obstructions that are not easily penetrated by the signals on these high frequency bands. In some implementations, the system may support time domain multiplexed (TDM) uplink carriers such that a UE may use high frequency bands (e.g., frequency bands associated with 5G NR) and low frequency bands (e.g., frequency bands associated with LTE, 2.1 GHz) to sequentially transmit uplink transmissions. Utilizing high frequency bands and low frequency bands may enhance coverage within a cell as low frequency bands may experience less propagation loss compared to high frequency bands. The high frequency band may be referred to as a first component carrier and the low frequency band may be referred to a second component carrier.

In some cases, a UE may have two transmission chains where one of the chains may support a first component carrier and the other transmission chain may support the first and second component carrier. The transmit chain that supports both the first and second component carrier may have two sets of components that may be used depending on the component carrier in use. A UE may switch between the first and second component carriers according to an uplink transmission schedule the UE receives from a base station. To switch between the first and second component carriers of the same transmit chain, the UE may retune the components of the transmit chain to the components associated with the current component carrier. A switching duration may be associated with switching between components of the first component carrier and components of the second component carrier, or vice versa. In some cases, high power consumption may result at a UE if switching between component carriers occurs frequently.

To mitigate power consumption at a UE, the frequency of switching operations may be limited. In some cases, the gap between two consecutive uplink carrier switching operations may be limited to a resource (e.g., slot, symbol), such that the UE may expect to perform at most one switching operation per resource. In some implementations, the gap between two consecutive uplink carrier switching operations may be limited to a duration, such that the UE may expect to perform at most one switching operation per a duration less than or equal to a threshold. Implementing restrictions on uplink carrier component switching may reduce power consumption and mitigate the risk of a UE over-heating.

Particular aspects of the subject matter described herein may be implemented to realize one or more advantages. The described techniques may support improvements in the carrier aggregation framework, and may decrease power consumption at a UE, reduce uplink transmission complexity at a UE, and mitigate the risk of a UE over-heating, among other advantages. As such, supported techniques may include improved network operations and, in some examples, may promote network efficiencies, among other benefits.

Aspects of the disclosure are initially described in the context of wireless communications systems. Aspects are then described with respect to transmit chain architecture, scheduled subframes, and a process flow. Aspects of the disclosure are further illustrated by and described with reference to apparatus diagrams, system diagrams, and flowcharts that relate to uplink carrier switching for wireless devices.

FIG. 1 illustrates an example of a wireless communications system 100 that supports uplink carrier switching for wireless devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some systems may support TDM'd carriers such that a UE may support multiple component carriers that may be different than each other to transmit uplink transmissions. To support multiple component carriers, a UE may have multiple transmit chains, where one transmit chain may support multiple component carriers. The component carriers of the same transmit chain may each be associated with a set of components. In some cases, a base station may indicate uplink transmission scheduling to a UE, where the schedule may indicate that the UE switches component carriers of a transmit chain. To switch component carriers, the UE may re-tune the transmit chain to the set of components associated with the component carrier indicated in the schedule. Frequent component carrier switching may cause increased power consumption at the UE.

To reduce power consumption, the frequency of component carrier switching may be limited. In some cases, switching may be limited by a resource or a duration. In some cases, the gap between two consecutive uplink carrier switching operations may be limited to a resource (e.g., slot, symbol), such that the UE may expect to perform at most one switching operation per resource. In some implementations, the gap between two consecutive uplink carrier switching operations may be limited to a duration, such that the UE may expect to perform at most one switching operation per a duration less than or equal to a threshold. Implementing restrictions on uplink carrier component switching may reduce power consumption and mitigate the risk of a UE over-heating.

Figure 2:
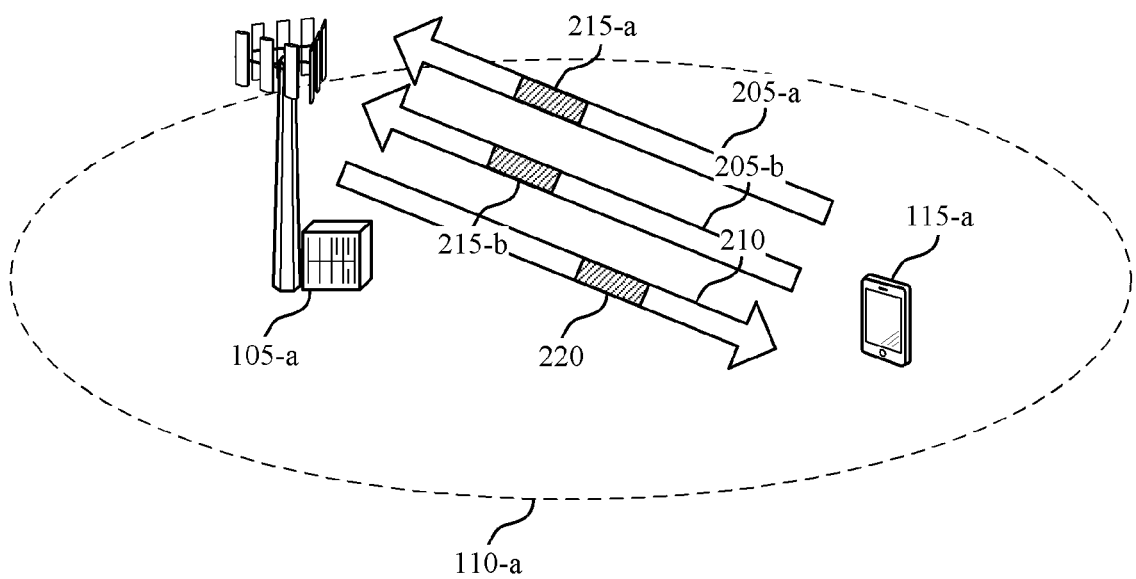
FIG. 2 illustrates an example of a wireless communications system that supports uplink carrier switching for wireless devices in accordance with aspects of the present disclosure.

FIG. 2 illustrates an example of a wireless communications system 00 that supports uplink carrier switching for wireless devices in accordance with aspects of the present disclosure. The wireless communications system 200 may include base station 105-a and UE 115-a, which may be examples of a base station 105 and UE 115 as described with reference to FIG. 1. Base station 105-a may serve a geographic coverage area 110-a. In some cases, base station 105-a may implement a restricted component carrier switching scheme for scheduling uplink transmissions at UE 115-a. Additionally or alternatively, other wireless devices, such as UE 115-a, or some combination of these UEs 115, may implement restricted component carrier switching for uplink transmissions.

In some systems (e.g., 5G NR), a UE 115 may use higher frequency bands (e.g., 3.5 GHz) to transmit uplink transmissions compared to other systems (e.g., LTE systems). In some implementations, transmissions at high frequency bands may experience propagation loss due to penetration. Propagation loss may decrease the coverage of a cell. To enhance coverage, lower bands (e.g., 2.1 GHz) associated with other systems (e.g., LTE systems) may be used as component carriers in 5G NR carrier aggregation. In some cases, carrier aggregation may be implemented to support transmissions on a component carrier associated with the high band and a component carrier associated with the low band. In some cases, conventional carrier aggregation may increase UE 115 implementation complexity. For example, conventional carrier aggregation may support one transmission chain for one component carrier associated with the high band and another transmission chain for one component carrier associated with the low band which may limit MIMO capability of the UE 115.

Some systems may implement a TDM'd uplink carrier. A TDM'd uplink carrier may support multiple (e.g., two) transmission chains of component carriers associated with high band and one transmission chain for a component carrier associated with low band according to TDM. In some cases, implementing a TDM'd uplink carrier in carrier aggregation may enhance coverage for cell-edge UEs as component carriers associated with low bands may be used to reduce penetration while maintaining MIMO capability. In some cases, the large frequency band associated with carrier aggregation using a TDM'd uplink carrier may be used for cell-center UEs 115 as the UEs 115 may be scheduled to a component carrier associated with a high band.

A TDM'd uplink carrier may be implemented in more than one way in carrier aggregation. In some cases, a supplementary uplink (e.g., SUL) carrier may be implemented. In some cases, carrier aggregation using a TDM'd uplink carrier may include two uplink carriers such as a first component carrier (e.g., 3.5 GHz NR TDD carrier) and a second component carrier (e.g., NR SUL carrier), and one downlink carrier. A UE 115 may operate on one uplink carrier (e.g., first or second component carrier) at a time. In some cases, a UE 115 may be scheduled for an uplink transmission on any uplink carrier in an arbitrary slot. As there is one downlink carrier, supplementary uplink carrier aggregation may operate in co-site case such that the two carriers may be associated with the same base station 105. In some implementations, supplementary uplink carrier aggregation may support one transmission chain associated with first component carrier and another transmission chain associated with the second component carrier. In this case, the transmission chains may not need to be retuned and there may not be a switching duration.

Additionally or alternatively to supplementary uplink carrier aggregation, TDM'd carrier aggregation may be implemented. TDM'd carrier aggregation may support two uplink carriers (e.g., one TDD carrier, and one FDD uplink carrier) and two downlink carriers (e.g., one TDD carrier, and one FDD downlink carrier). As there are multiple downlink carriers, TDM'd carrier aggregation may operate in co-site or non co-site cases. In some cases, the UE 115 may operate on one uplink carrier at a time (e.g., semi-statistic pattern or dynamic pattern). In some cases, a UE 115 may have better power control operating according to TDM'd carrier aggregation than when operating in supplementary uplink carrier aggregation because TDM'd carrier aggregation supports multiple downlink carriers. In some cases, a UE 115 may have multiple timing advances because TDM'd carrier aggregation supports two downlink carriers.

In some implementations, supplementary uplink carrier aggregation and TDM'd carrier aggregation may both support two transmission chains for one component carrier and one transmission chain for the other component carrier. In cases where a UE 115 has two antennas, one transmission chain may support both component carriers and one transmission chain may support one component carrier. Each component carrier of a transmit chain may be associated with a set of components. A transmit chain may support one component carrier at a time where the transmit chain uses the set of components associated with the currently supported component carrier. In some cases, a switching time (e.g., 35 μs, 70 μs, 140 μs) is associated with retuning a transmit chain between sets of components of component carriers.

For example, base station 105-a may transmit a downlink transmission to UE 115-a via downlink transmission 210. Downlink transmission 210 may include message 220 that may include scheduling information, or data, or a combination thereof. In some cases, message 220 may be a PDCCH, PDSCH, etc. In some cases, downlink transmission 210 may be carried on a component carrier associated with high bands, low bands, FDD, TDD, or a combination thereof. UE 115-a may transmit uplink transmissions to base station 105-a via uplink transmissions 205-a and 205-b. Uplink transmissions 205-a and 205-b may carry messages 215-a and 215-b, respectively. In some cases, messages 215-a and 215-b may be sound reference signals (SRSs), physical uplink shared channels (PUSCHs), physical uplink control channels (PUCCHs), random access channels (RACHs), etc.

In some implementations, UE 115-a may simultaneously transmit on one uplink transmission 205 and receive a downlink transmission 210. In some cases, more than one downlink transmission may be received simultaneously. In some cases, messages 215-a and 215-b may be carried on component carriers associated with high bands, low bands, FDD, TDD, or a combination thereof. For example, message 215-a may be carried on a first component carrier (e.g., high band carrier, TDD carrier, or a combination thereof) and message 215-b may be transmitted on a second component carrier (e.g., NR SUL carrier, low band carrier, FDD carrier, or a combination thereof). In some cases, the first and second component carrier may be supported by one transmit chain such that one uplink message 215 may be transmitted at a time.

In some implementations, switching between component carriers of a transmit chain may be dynamic and base station 105-a may indicate a switching event. UE 115-a may switch between the first and second component carrier based on the uplink transmission schedule indicated by base station 105-a. In some cases, base station 105-a may not account for the switching capability of UE 115-a and may schedule switching events in short durations. In some cases, frequent switching may increase power consumption and cause overheating at UE 115-a.

To reduce power consumption and mitigate the risk of over-heating at the UE 115, the frequency of component carrier switching may be limited. In some cases, switching may be limited according to a switching rule or based on the capability of the UE 115. In some cases, the switching rule may limit component carrier switching by a resource or a duration (e.g., threshold). In some cases, the gap between two consecutive uplink carrier switching operations may be limited to a resource (e.g., slot, symbol), such that the UE 115 may expect to perform at most one switching operation per resource. In some implementations, the gap between two consecutive uplink carrier switching operations may be limited to a duration, such that the UE 115 may expect to perform at most one switching operation per a duration less than or equal to a threshold. Implementing restrictions on uplink carrier component switching may reduce power consumption and mitigate the risk of a UE 115 over-heating.

Figure 3:
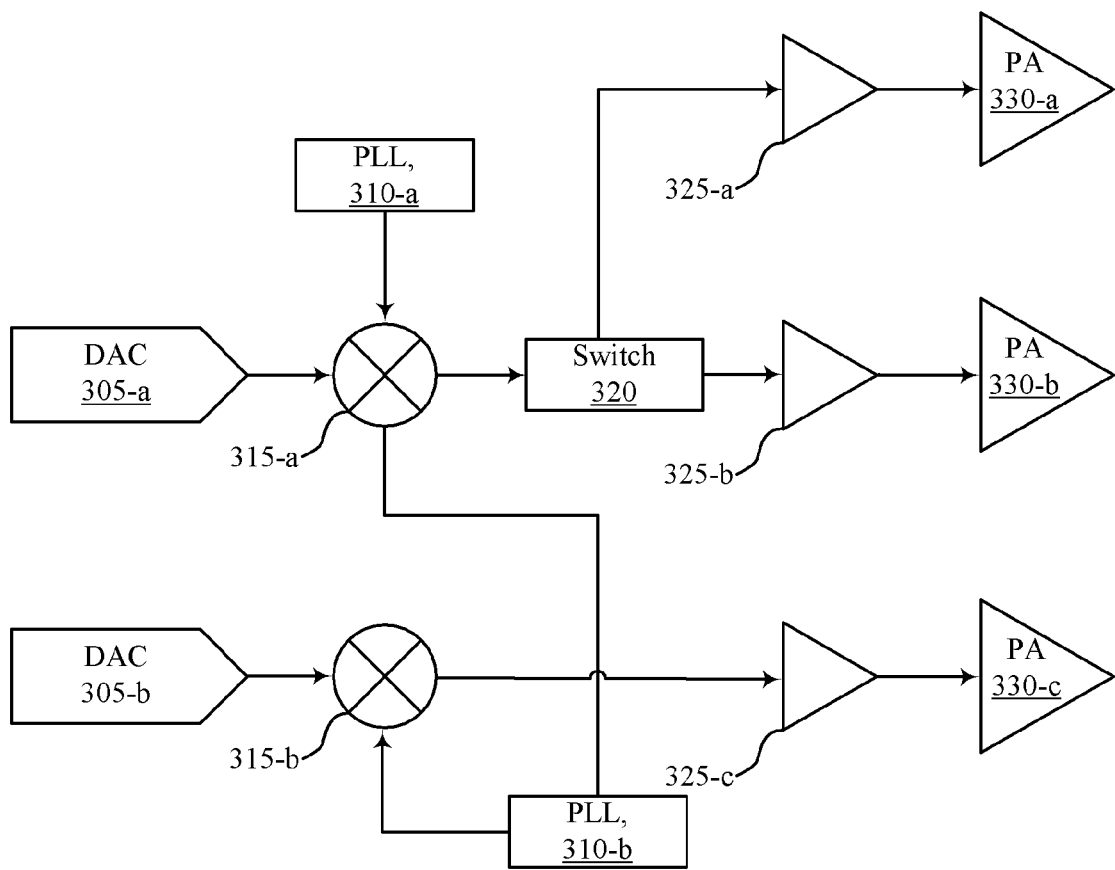
FIG. 3 illustrates an example of a transmit chain architecture that supports uplink carrier switching for wireless devices in accordance with aspects of the present disclosure.

FIG. 3 illustrates an example of a transmit chain architecture 00 that supports uplink carrier switching for wireless devices in accordance with aspects of the present disclosure. The transmit chain architecture 300 may include a set of components, which may be components included in base stations or UEs as described with reference to FIGS. 1 and 2. The set of components may complete one or more transmit chains that may be used to transmit uplink transmissions at a UE. For example, transmit chain architecture 300 may implement TDM's carrier aggregation according to a restricted component carrier switching scheme. Additionally or alternatively, other wireless devices may implement restricted component carrier switching for uplink transmissions.

A UE may include one or more transmit chains that may be used to complete an uplink transmission. The path started by digital-to-analog converter (DAC) 305-*a* may be one transmit chain and the path started by DAC 305-*b* may be a second transmit chain. A transmit chain may include a DAC (e.g., DAC 305-*a* or 305-*b*), a phase lock loop (PLL) (e.g., PLL 310-*a* or 310-*b*), a mixer or modulator 315-*a* or 315-*b*, a switching component 320, discrete regulator (DR) (e.g., DR 325-*a*, 325-*b*, or 325-*c*), or a power amplifier (PA) (e.g., PA 330-*a*, 330-*b*, or 330-*c*), or a combination thereof. For an uplink transmission, a UE may utilize each component in a transmit chain to transmit an uplink transmission.

A DAC 305 may be a system that converts a digital signal into an analog signal. A PLL 310 may be a system that may include a phase detector, a filter, an oscillator, etc. The PLL 310 may be a negative feedback-based system that may generate a periodic signal that tracks the frequency of an input signal. Switching component 320 may switch configurations of the first transmit chain according to the scheduled component carrier from one set of components to a second set of components. A DR 325 may maintain a constant voltage level. A PA 330 may increase a low power signal to a higher power level.

In some cases, a UE may have more than one (e.g., two) transmit chains. A first component carrier (e.g., high band TDD component carrier) may use both transmission chains. A second component carrier (e.g., low band FDD component carrier) may use one of the transmit chains. For example, a transmit chain may be associated with one component carrier, either the first or second component carrier, such as the transmit chain associated with DAC 305-*b* (e.g., second transmit chain). In some cases, one transmit chain may be associated with the first component carrier and the second component carrier, such as the transmit chain associated with DAC 305-*a* (e.g., first transmit chain). The first transmit chain may include two sets of components, where one set of components may be associated with a first component carrier and the other set of components may be associated with the second component carrier. In some cases, the transit chain may re-tune to switch between the components associated with the first component carrier and the components associated with the second component carrier.

For example, the first transmit chain, may include two implementations: one that ends with PA 330-*a* and another than ends with PA 330-*b*. Retuning may occur such that the first transmit chain switches from using components leading to PA 330-*a* to components leading to PA 330-*b*, or vice versa. Both the first component carrier and the second component carrier may be associated with DAC 305-*a* (e.g., DAC 1), mixer 315-*a*, and switch 320. A first component carrier may also be associated with PLL 310-*b* (e.g., PLL 2), DR 325-*b* (e.g., DR 1), and PA 330-*b* (e.g., PA 1). A second component carrier may be associated with PLL 310-*a* (PLL 1), DR 325-*a* (e.g., DR 3), and PA 330-*a* (e.g., PA 3). In some cases, the second transmit chain including DAC 305-*b* (e.g., DAC 2), PLL 310-*b* (e.g., PLL 2), mixer 315-*b*, DR 325-*c* (e.g., DR 2), and PA 330-*c* (e.g., PA 2) may be another transmit chain used for the first component carrier.

Component carrier retuning on the first transmit chain may switch between PA 330-*a* and PA 330-*b*, and between PLL 310-*a* and PLL 310-*b* based on the last component carrier and the currently scheduled component carrier. In some cases, a base station may indicate an uplink transmission schedule that may indicate the component carrier to be used for each uplink transmission. The base station may schedule uplink transmissions such that multiple switching occasions occur in a short duration. In some cases, switching may occur every 0 μs, 35 μs, 70 μs, or 200 μs, or a combination thereof. Frequent switching may cause increased power consumption at the UE. To decrease the power consumption at the UE due to switching between component carriers, restrictions such as a switching rule may be placed on the UE and base station to limit the number of switching occasions in a given duration or resource (e.g., symbol, slot). In some cases, the restricted switching configuration may be based on the capability of the UE.

Figure 4:
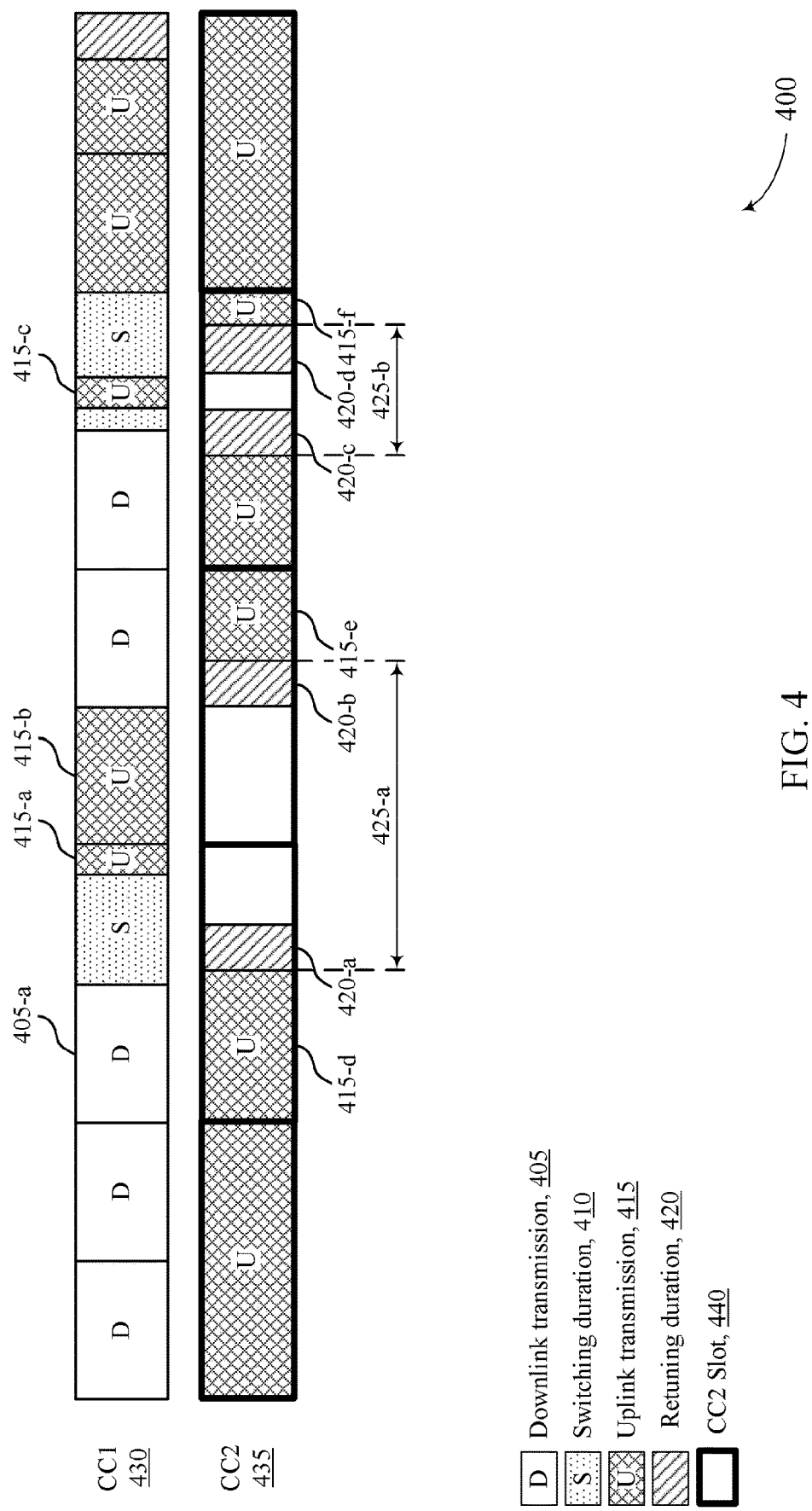
FIG. 4 illustrates an example of scheduled subframes that support uplink carrier switching for wireless devices in accordance with aspects of the present disclosure.

FIG. 4 illustrates an example of scheduled subframes 00 that support uplink carrier switching for wireless devices in accordance with aspects of the present disclosure. The scheduled subframes 400 may represent uplink and downlink transmissions between base stations or UEs as described with reference to FIGS. 1 and 2. The uplink transmissions of the scheduled subframes 400 may be transmitted on one or more component carriers. Scheduled subframes 400 may implement a restricted component carrier switching scheme. Additionally or alternatively, other wireless devices may implement restricted component carrier switching for uplink transmissions.

As described with reference to FIGS. 2 and 3, a UE may have two transmit chains where a first transmit chain may support a first component carrier (e.g., high band (e.g., 3.5 GHz) TDD component carrier) and a second component carrier (e.g., low band (e.g., 2.1 GHz) FDD component carrier) and a second transmit chain may support the first component carrier. In some cases, a transmit chain may have separate sets of components that each support one component carrier. For example, one set of components of the first transmit chain may support the first component carrier and another set of components of the first transmit chain may support the second component carrier. In some cases, components of the first transmit chain may need to be switched during a retuning duration depending on the component carrier of the next uplink transmission.

For example, CC1 430 may be the first component carrier, and CC2 435 may be the second component carrier. CC1

430 may include multiple resources (e.g., slots, symbols) where each may indicate a downlink transmission 405, switching duration 410, uplink transmission 415, or retuning duration 420. CC2 435 may include multiple resources (e.g., slots, symbols) such as CC2 slots 440, where each may indicate a downlink transmission 405, switching duration 410, uplink transmission 415, and retuning duration 420. In some cases, CC1 430 has a larger subcarrier spacing (SCS) than CC2 435, so that the slot duration of CC1 430 is smaller than the slot durations of CC2 435. In some cases, CC1 430 has the same SCS as CC2 435, so that the slots of CC1 430 and CC2 435 may be the same or similar duration. In some cases, component carrier switching may occur between CC1 430 and CC2 435 such that the UE may retune components of the same transmit chain to transmit one uplink transmission 415 over one of the component carriers at a time.

In some cases, the frequency of uplink component carrier switching may be limited to decrease the power consumption at a UE according to a switching rule of UE capability. In some cases, switching may be limited by a gap that may refer to a resource (e.g., symbol, slot) or a duration. In some implementations, the limitation (e.g., resource, or duration) may be channel dependent. For example, if the switching is for SRS carrier switching, a smaller duration gap (e.g., 4 symbols), or resource may be defined as the switching rule, or no specific restriction may be defined. In another example, if the switching event is to transmit a PUSCH, PUCCH, or a RACH, a larger gap (e.g., 14 symbols) may be defined as the limitation between two switching events due to more preparation time needed for the uplink transmission 415.

In some cases, the gap between two consecutive uplink carrier switching operations may be limited to a resource (e.g., slot, symbol), such that the UE 115 may expect to perform at most one switching operation per resource. In some cases, the slot duration set for the component carrier switching frequency may be the CC2 slot 440. For example, the switching rule may indicate that one retuning duration 420 may occur per CC2 slot 440. For example, the UE may receive downlink transmission 405-a over CC1 430 at the same time the UE may transmits uplink transmission 415-d over CC2 435. Following uplink transmission 415-d, retuning duration 420-a may be scheduled to switch between CC2 435 and CC1 430. During a retuning duration 420, the UE may not be scheduled to transmit or receive to allow for the UE to retune the first transmit chain.

Following retuning duration 420-a, the UE may transmit uplink transmissions 415-a and 415-b. In some implementations, uplink transmission 415-a may be an SRS transmission and uplink transmission 415-b may be a PUSCH, PUCCH, RACH, etc. Uplink transmission 415-a may be transmitted in less symbols than uplink transmission 415-b. Another retuning duration 420 (e.g., retuning duration 420-b) may be scheduled following uplink transmissions 415-a and 415-b on CC1 430. The UE may use retuning duration 420-b to switch components of the first transmit chain to support CC2 435 so that the UE may transmit uplink transmission 415-e on CC2 435. In this case, one retuning duration was scheduled and occurred per the second CC2 slot 440 and one retuning duration occurred during the third CC2 slot 440. This configuration may follow the switching rule.

Alternatively, retuning durations 420-c and 420-d may be scheduled during the same fourth slot associated with CC2 435. If uplink transmission 415-c is scheduled for an SRS transmission, the UE may follow the schedule, switch component carriers, and transmit uplink transmission 415-c over component carrier CC1 430. If uplink transmission 415-c is not scheduled for an SRS transmission and is instead scheduled for a PUSCH, PUCCH, or RACH transmission, then the switching rule may not be met and the UE may recognize this as an error case and fail to perform the switch and uplink transmission 415.

Additionally or alternatively, the gap between two consecutive uplink carrier switching operations may be limited to a duration, such that the UE 115 may expect to perform at most one switching operation per a duration less than or equal to a threshold. In some cases, the threshold may be channel dependent as described herein.

For example, a UE may be scheduled to transmit an uplink transmission 415-d on CC2 435, switch component carrier components of the first transmit chain during retuning duration 420-a, transmit uplink transmissions 415-a (e.g., SRS transmission) and 415-b (e.g., a PUSCH, PUCCH, or RACH transmission) on CC1 430, and then switch component carriers during retuning duration 420-b. Gap 425-a may be defined from the start of retuning duration 420-a to the end of retuning duration 420-b. In some cases, gap 425-a may be defined from the end of the first uplink transmission 415-a on CC1 430 to the start of the third uplink transmission 415-c on CC1 430. If gap 425-a is greater than or equal to the threshold duration defined by the switching rule for larger uplink channels such as PUSCH, PUCCH, and RACH transmissions (e.g., 14 symbols, 14 ms), then the frequency of switching events may comply with the switching rule. If gap 425-a is less than the threshold duration defined by the switching rule, then the frequency of scheduled switching events may not comply with the limitation and the UE may recognize this duration as an error and fail to switch component carriers and transmit uplink transmissions 415-a and 415-b.

In some cases, the UE may be scheduled to switch between CC2 435 and CC1 430 during retuning duration 420-c, transmit SRS uplink transmission 415-c on CC1 430, and switch between CC1 430 and CC2 435 during retuning duration 420-d. Gap 425-b may be defined from the start of retuning duration 420-c to the end of retuning duration 420-d. If gap 425-b is greater than or equal to the threshold duration defined by the switching rule for smaller transmissions such as SRS transmissions (e.g., 4 symbols, 4 ms), then the frequency of switching events may comply with the switching rule. If gap 425-a is less than the threshold duration, then the frequency of scheduled switching events may not comply with the limitation and the UE may recognize this duration as an error and fail to switch component carriers and transmit uplink transmission 415-c.

In some implementations, three uplink transmissions 415 may be scheduled. For example, a first uplink transmission 415 may be scheduled on CC1 430, a second uplink transmission 415 may be scheduled on CC2 435, and a third uplink transmission 415 may be scheduled on a third component that may be different or the same as CC1 430. In some cases, the gap between two consecutive carriers may be defined as starting at the end of the first uplink transmission 415 and ending at the start of the third uplink transmission 415.

In some cases, the threshold for the gap 425 between two uplink carrier switching events may be preconfigured. In some cases, the UE may indicate the threshold as a capability of the UE to a base station and the base station may schedule uplink transmissions on one or more carrier components according to the indicated capability of the UE. In some cases, the restriction may be employed in a preconfigured situation such as to save UE power consumption in some situations. Implementing restrictions on uplink carrier component switching may reduce power consumption and mitigate the risk of a UE 115 over-heating.

Figure 5:
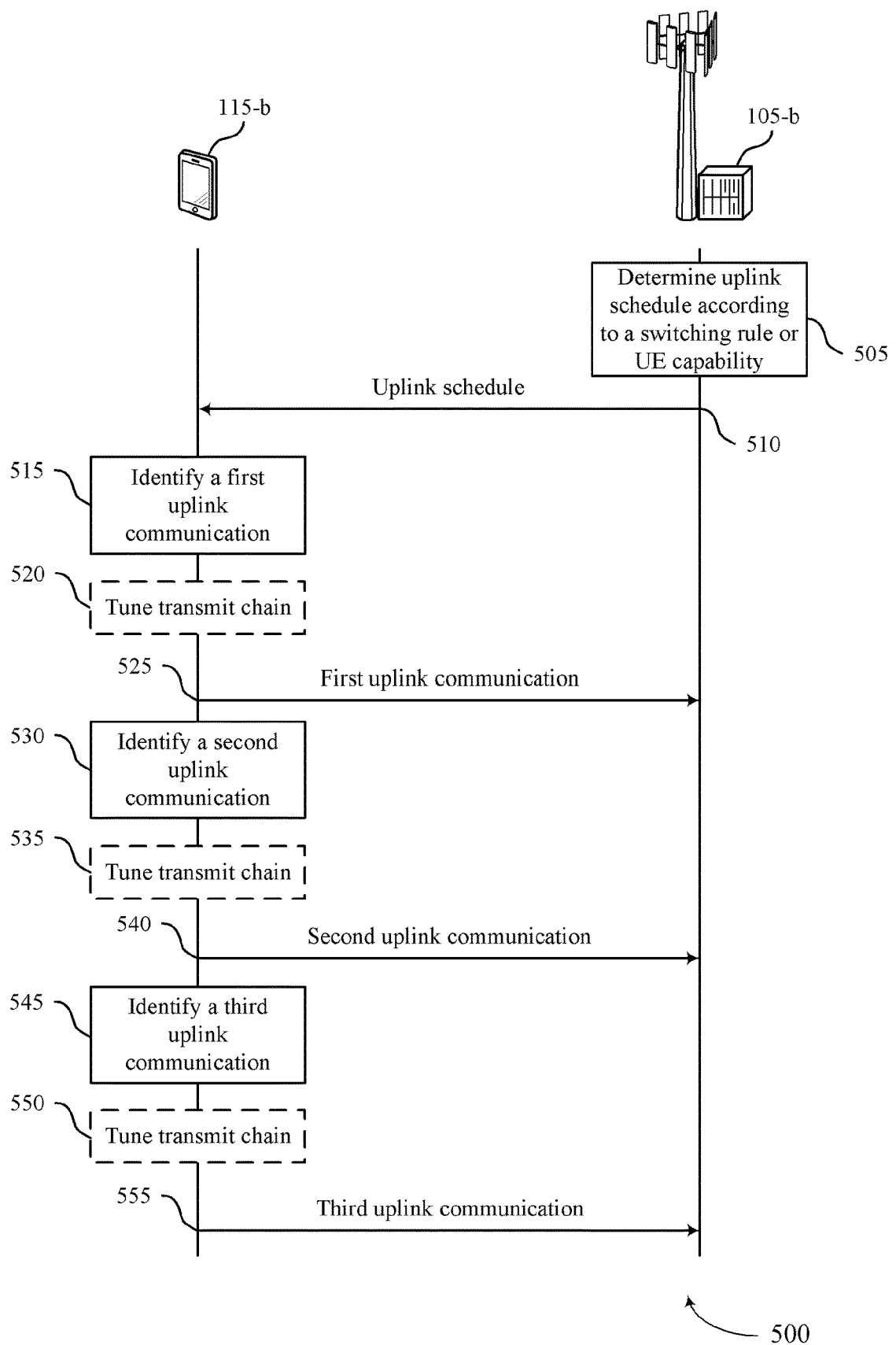
FIG. 5 illustrates an example of a process flow that supports uplink carrier switching for wireless devices in accordance with aspects of the present disclosure.

FIG. 5 illustrates an example of a process flow 00 that supports uplink carrier switching for wireless devices in accordance with aspects of the present disclosure. The process flow 500 may illustrate an example component carrier retuning scheme. For example, base station 105-b may transmit an uplink transmission schedule to UE 115-a that may comply with restricted component carrier switching. Base station 105-b and UE 115-b may be examples of the corresponding wireless devices described with reference to FIGS. 1 and 2. In some cases, instead of base station 105-a implementing the restricted switching schedule, a different type of wireless device (e.g., a UE 115) may indicate a restricted component carrier switching schedule. Alternative examples of the following may be implemented, where some steps are performed in a different order than described or are not performed at all. In some cases, steps may include additional features not mentioned below, or further steps may be added.

At 505, base station 105-b may determine an uplink schedule for UE 115-b based on a switching rule or based on the capability of UE 115-b.

At 510, UE 115-b may receive an uplink schedule (e.g., uplink grant) from base station 105-b. The uplink schedule may schedule uplink transmissions on one or more component carriers. In some cases, the uplink schedule may schedule component carriers such that the frequency of switching between component carriers complies with a switching rule or capability of UE 115-b. For example, the gap between two consecutive uplink carrier switching operations may be limited to a resource (e.g., slot, symbol), such that the UE may expect to perform at most one switching operation per resource. In some implementations, the gap between two consecutive uplink carrier switching operations may be limited to a duration (e.g., 14 symbols, 14 ms), such that the UE may expect to perform at most one switching operation per a duration less than or equal to a threshold.

At 515, UE 115-b may identify a first uplink communication on a first uplink carrier. The first uplink carrier may operate in high band, low band, TDD, FDD, or a combination thereof.

In some cases, a UE may have two transmit chains, where one of the transmit chains may support one or more component carriers. The transmit chain may have a separate set of components associated with each supported component carrier. At 520, UE 115-b may optionally tune the components of a transmit chain to the components associated with the first uplink carrier. For example, if the last uplink transmission was on an uplink carrier different than the first uplink carrier (e.g., second uplink carrier, third uplink carrier) then UE 115-b may retune to the components associated with the first uplink carrier.

At 525, UE 115-b may transmit a first uplink communication. The first uplink communication may be transmitted on the first uplink component carrier.

At 530, UE 115-b may determine a second uplink communication on a second uplink carrier. The second uplink carrier may operate in high band, low band, TDD, FDD, or a combination thereof. In some cases, the second uplink component carrier may be the same as the first uplink component carrier, or the second component carrier may be different.

At 535, UE 115-b may optionally tune the components of a transmit chain to the components associated with the second uplink carrier. For example, if the first uplink carrier and the second uplink carrier are different carriers, then UE 115-b may retune the components of the transmit chain to the components associated with the second uplink carrier.

At 540, UE 115-b may transmit a second uplink communication. The second uplink communication may be transmitted on the second uplink component carrier.

At 545, UE 115-b may determine a third uplink communication on a third uplink carrier. The second uplink carrier may operate in high band, low band, TDD, FDD, or a combination thereof. In some cases, the third uplink component carrier may be the same as the first uplink component carrier, or the second uplink component carrier, or the third component carrier may be different.

At 550, UE 115-b may optionally tune the components of a transmit chain to the components associated with the third uplink carrier. For example, if the second uplink carrier and the third uplink carrier are different carriers, then UE 115-b may retune the components of the transmit chain to the components associated with the third uplink carrier at 550.

At 555, UE 115-b may transmit a third uplink communication, where a timing relationship between the first uplink communication and the third uplink communication may be in accordance with a consecutive uplink switching rule or capability of UE 115-b. The third uplink communication may be transmitted on the third uplink component carrier.

Figure 6:
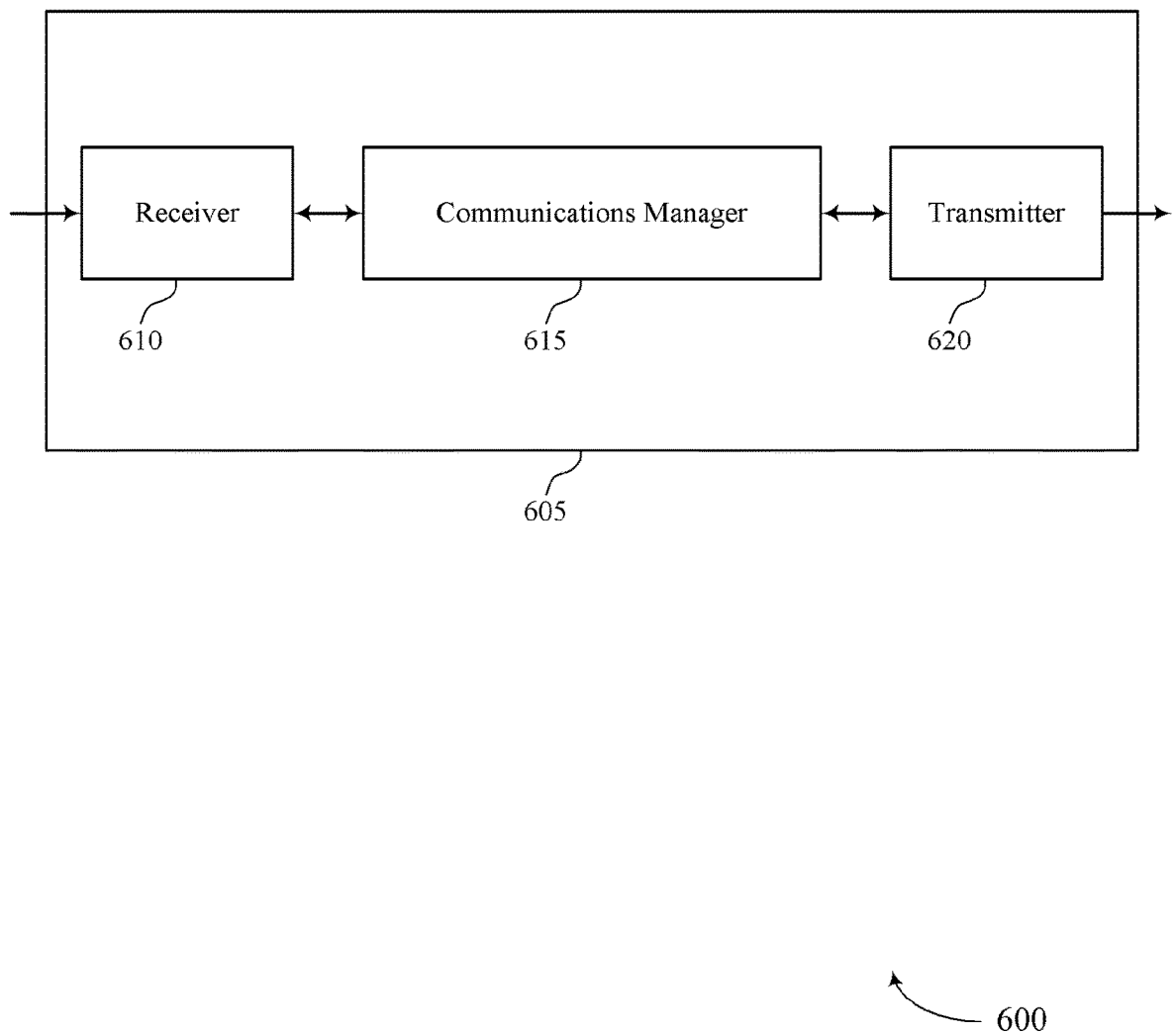
FIGS. 6 and 7 show block diagrams of devices that support uplink carrier switching for wireless devices in accordance with aspects of the present disclosure.

FIG. 6 shows a block diagram 600 of a device 605 that supports uplink carrier switching for wireless devices in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to uplink carrier switching for wireless devices, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a first uplink communication to be transmitted on a first uplink carrier, determine, after the first uplink communication, a second uplink communication to be transmitted on a second uplink carrier, determine, after the second uplink communication, a third uplink communication to be transmitted on a third uplink carrier, where a timing relationship between the first uplink communication and the third uplink communication is in accordance with a consecutive uplink switching rule or a UE capability, and transmit at least one of the first, second, or third uplink communications, or a combination thereof based on the determinations. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
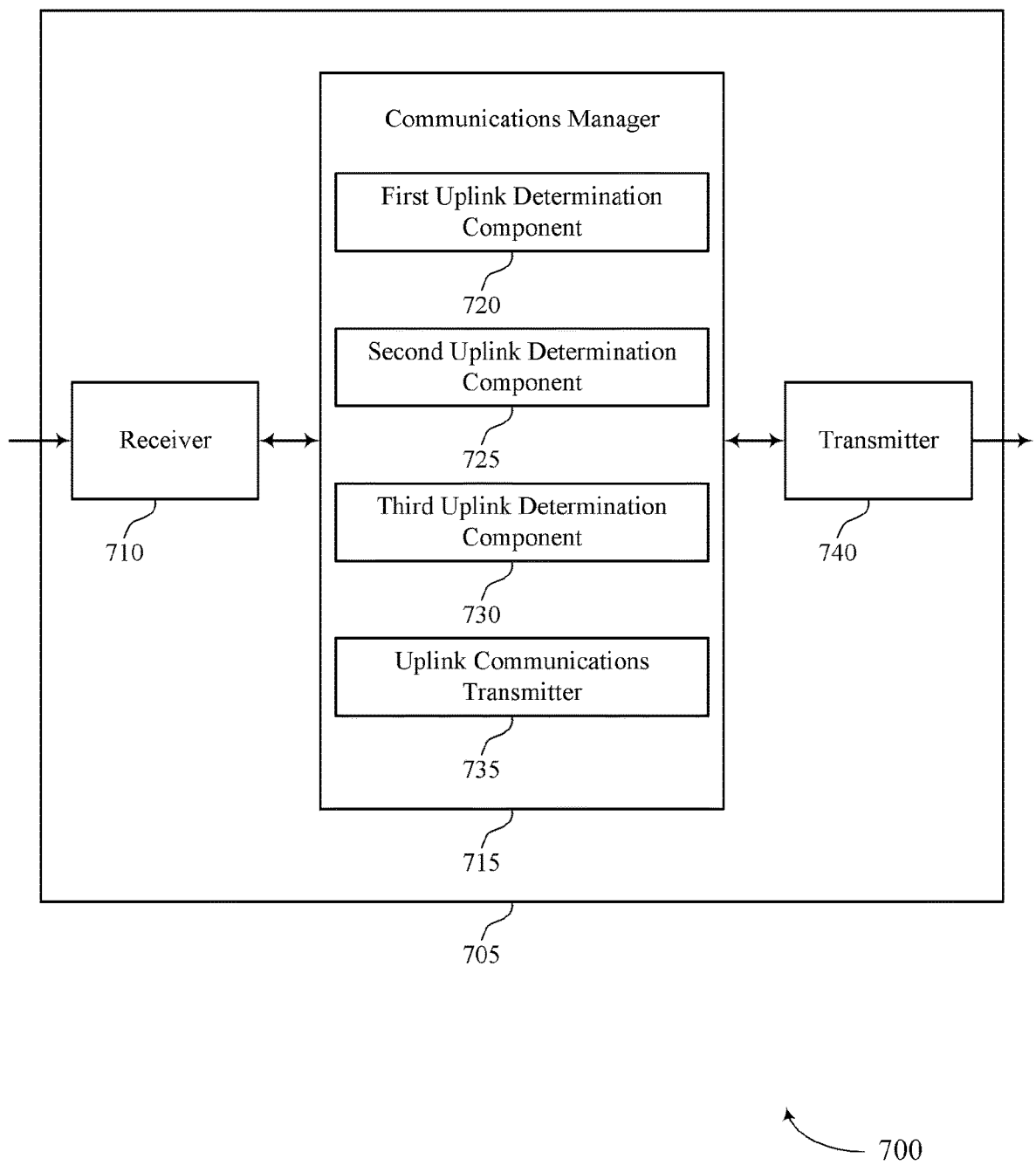

FIG. 7 shows a block diagram 700 of a device 705 that supports uplink carrier switching for wireless devices in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to uplink carrier switching for wireless devices, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a first uplink determination component 720, a second uplink determination component 725, a third uplink determination component 730, and an uplink communications transmitter 735. The communications manager 715 may be an example of aspects of the communications manager 910 described herein.

The first uplink determination component 720 may determine a first uplink communication to be transmitted on a first uplink carrier. The second uplink determination component 725 may determine, after the first uplink communication, a second uplink communication to be transmitted on a second uplink carrier. The third uplink determination component 730 may determine, after the second uplink communication, a third uplink communication to be transmitted on a third uplink carrier, where a timing relationship between the first uplink communication and the third uplink communication is in accordance with a consecutive uplink switching rule or a UE capability. The uplink communications transmitter 735 may transmit at least one of the first, second, or third uplink communications, or a combination thereof based on the determinations.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
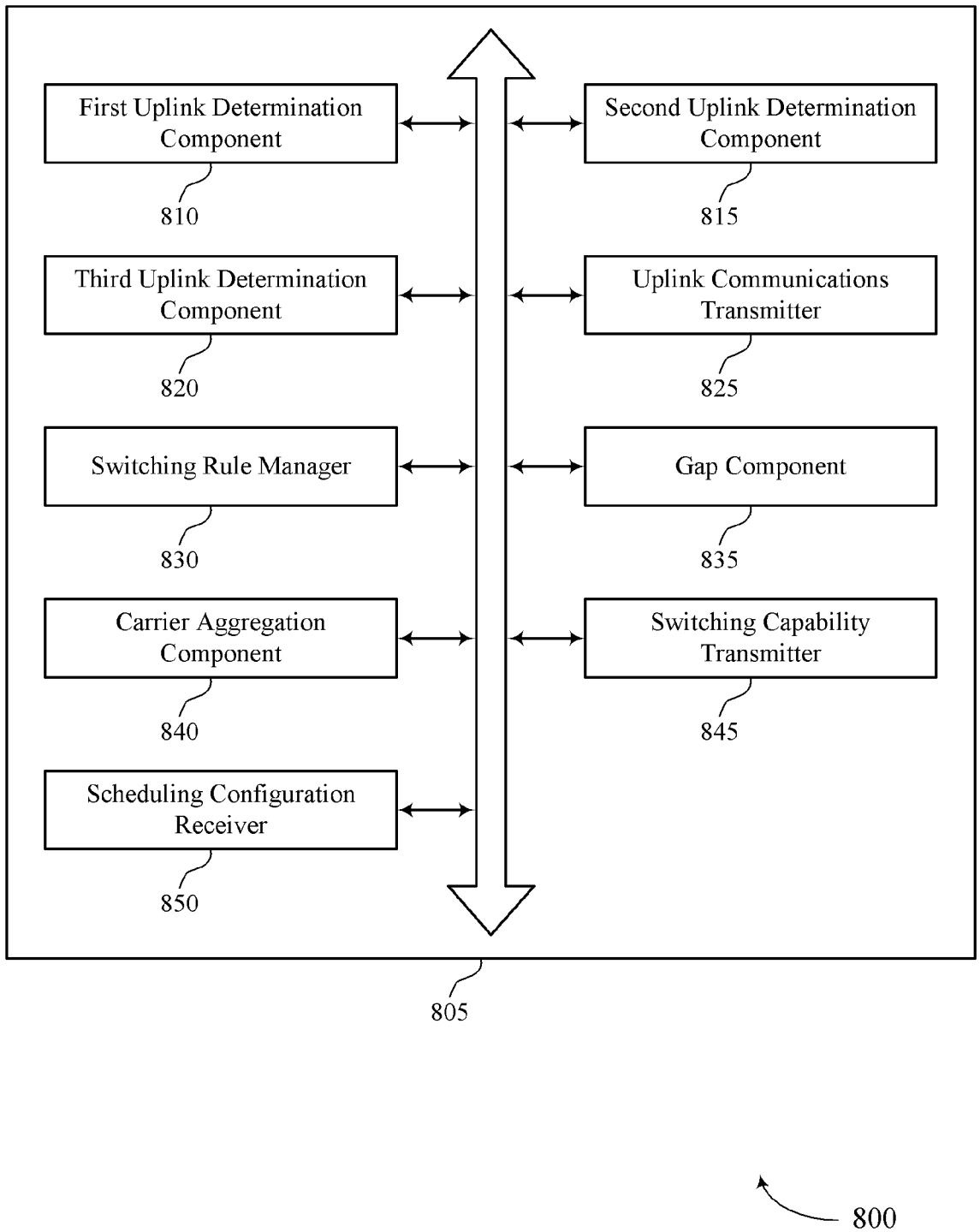
FIG. 8 shows a block diagram of a communications manager that supports uplink carrier switching for wireless devices in accordance with aspects of the present disclosure.

FIG. 8 shows a block diagram 800 of a communications manager 805 that supports uplink carrier switching for wireless devices in accordance with aspects of the present disclosure. The communications manager 805 may be an example of aspects of a communications manager 615, a communications manager 715, or a communications manager 910 described herein. The communications manager 805 may include a first uplink determination component 810, a second uplink determination component 815, a third uplink determination component 820, an uplink communications transmitter 825, a switching rule manager 830, a gap component 835, a carrier aggregation component 840, a switching capability transmitter 845, and a scheduling configuration receiver 850. Each of these modules may communicate, directly or indirectly, with one another (e.g., via one or more buses).

The first uplink determination component 810 may determine a first uplink communication to be transmitted on a first uplink carrier. The second uplink determination component 815 may determine, after the first uplink communication, a second uplink communication to be transmitted on a second uplink carrier.

The third uplink determination component 820 may determine, after the second uplink communication, a third uplink communication to be transmitted on a third uplink carrier, where a timing relationship between the first uplink communication and the third uplink communication is in accordance with a consecutive uplink switching rule or a UE capability. In some cases, the first uplink carrier and the third uplink carrier are a same carrier. The uplink communications transmitter 825 may transmit at least one of the first, second, or third uplink communications, or a combination thereof based on the determinations.

The switching rule manager 830 may identify that the consecutive uplink switching rule limits a number of consecutive uplink switches that occur within a slot of the first uplink carrier, the second uplink carrier, or the third uplink carrier based on a numerology associated with a respective uplink carrier. In some cases, the number of consecutive uplink switches within the slot allowed by the consecutive uplink switching rule is one. In some cases, the consecutive uplink switching rule includes an exception consecutive uplink switching pertaining to transmission of a sounding reference signal communication. In some cases, the channel type is associated with the first uplink communication, the second uplink communication, or the third uplink communication. In some cases, the consecutive uplink switching rule provides a minimum gap between the first uplink communication and the third uplink communication based on the consecutive uplink switching capability.

The gap component 835 may identify that the consecutive uplink switching rule provides a minimum gap between the first uplink communication and the third uplink communication. In some cases, the minimum gap between the first uplink communication and the third uplink communication is dependent on channel type. In some cases, the minimum gap corresponds to a first gap when the second uplink communication includes a sounding reference signal. In some cases, the minimum gap corresponds to a second gap when the second uplink communication includes signal other than the sounding reference signal. In some cases, the first gap is less than the second gap. In some cases, the first gap or the second gap is based on a predefined gap configuration, a capability of the UE, a configuration from the base station, or any combination thereof. In some cases, the minimum gap between the first uplink communication and the third uplink communication is associated with symbols between an end of the first uplink communication and a beginning of the third uplink communication.

The carrier aggregation component 840 may identify that the UE is configured for time division multiplexed uplink carrier aggregation such that the UE switches between two or more uplink carriers for uplink communications. The switching capability transmitter 845 may transmit, to a base station, a consecutive uplink switching capability of the UE, where the consecutive uplink switching capability is the UE capability. The scheduling configuration receiver 850 may receive a scheduling configuration for the first uplink communication, the second uplink communication, and the third uplink communication that is in accordance with the consecutive uplink switching capability.

Figure 9:
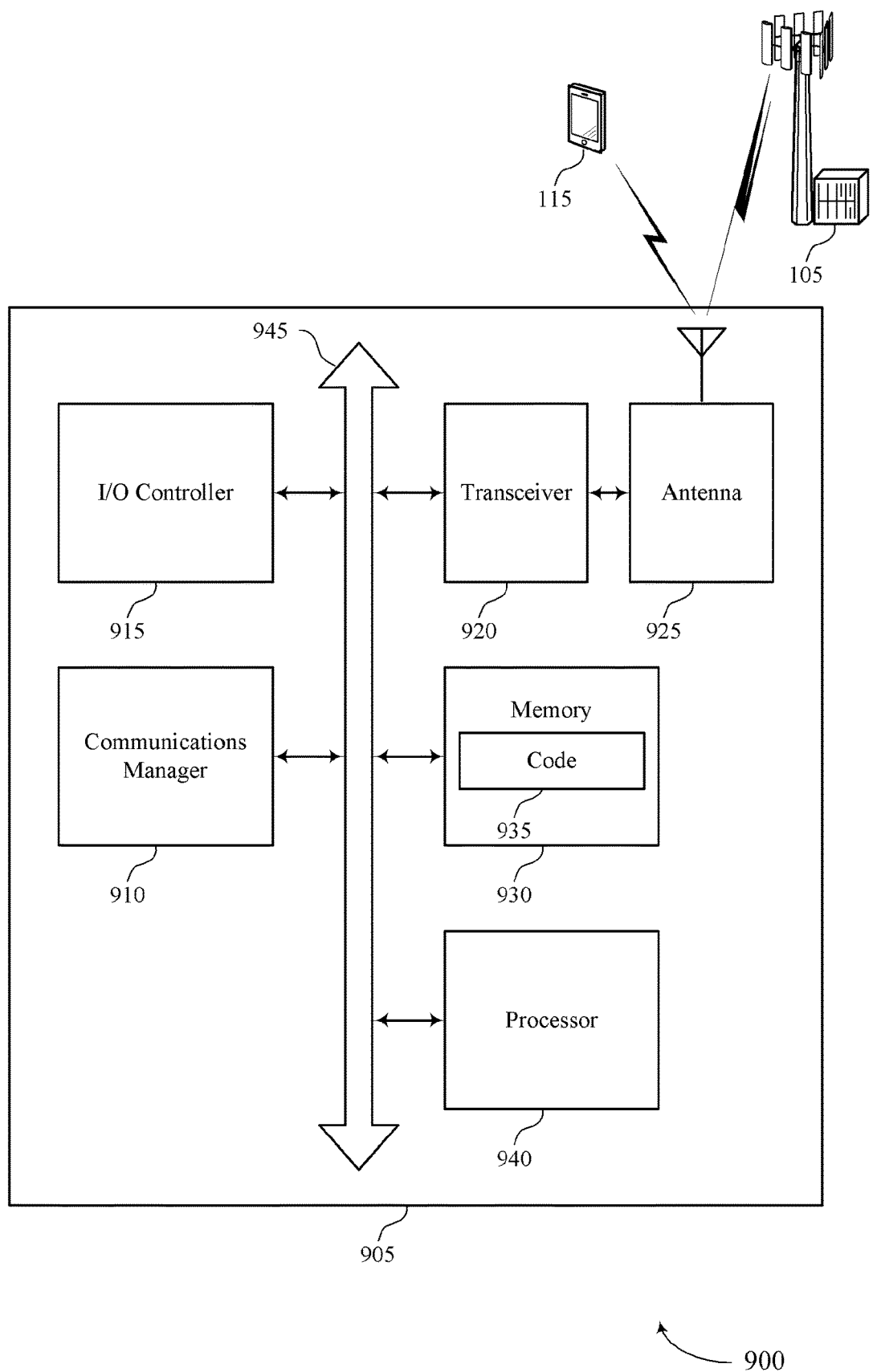
FIG. 9 shows a diagram of a system including a device that supports uplink carrier switching for wireless devices in accordance with aspects of the present disclosure.

FIG. 9 shows a diagram of a system 900 including a device 905 that supports uplink carrier switching for wireless devices in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine a first uplink communication to be transmitted on a first uplink carrier, determine, after the first uplink communication, a second uplink communication to be transmitted on a second uplink carrier, determine, after the second uplink communication, a third uplink communication to be transmitted on a third uplink carrier, where a timing relationship between the first uplink communication and the third uplink communication is in accordance with a consecutive uplink switching rule or a UE capability, and transmit at least one of the first, second, or third uplink communications, or a combination thereof based on the determinations.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink carrier switching for wireless devices).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
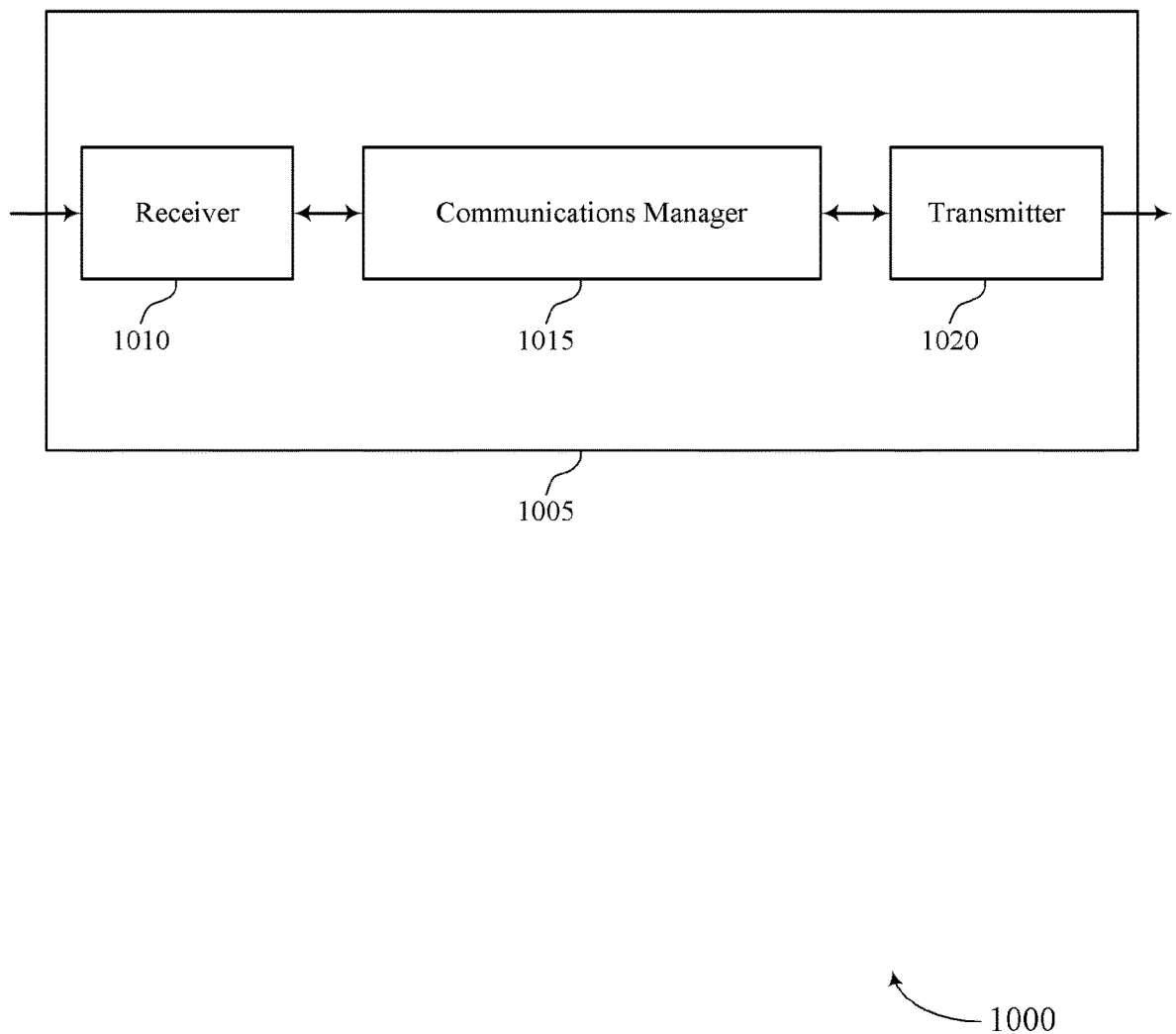
FIGS. 10 and 11 show block diagrams of devices that support uplink carrier switching for wireless devices in accordance with aspects of the present disclosure.

FIG. 10 shows a block diagram 1000 of a device 1005 that supports uplink carrier switching for wireless devices in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink carrier switching for wireless devices, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine a first uplink communication to be transmitted on a first uplink carrier from a UE, determine, after the first uplink communication, a second uplink communication to be transmitted on a second uplink carrier, determine, after the second uplink communication, a third uplink communication to be transmitted on a third uplink carrier, where a timing relationship between the first uplink communication and the third uplink communication is in accordance with a consecutive uplink switching rule or a UE capability, transmit a scheduling configuration to the UE for at least one of the first, second, or third uplink communications based on the determinations, and receive at least one of the first, second, or third uplink communications based on the scheduling configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
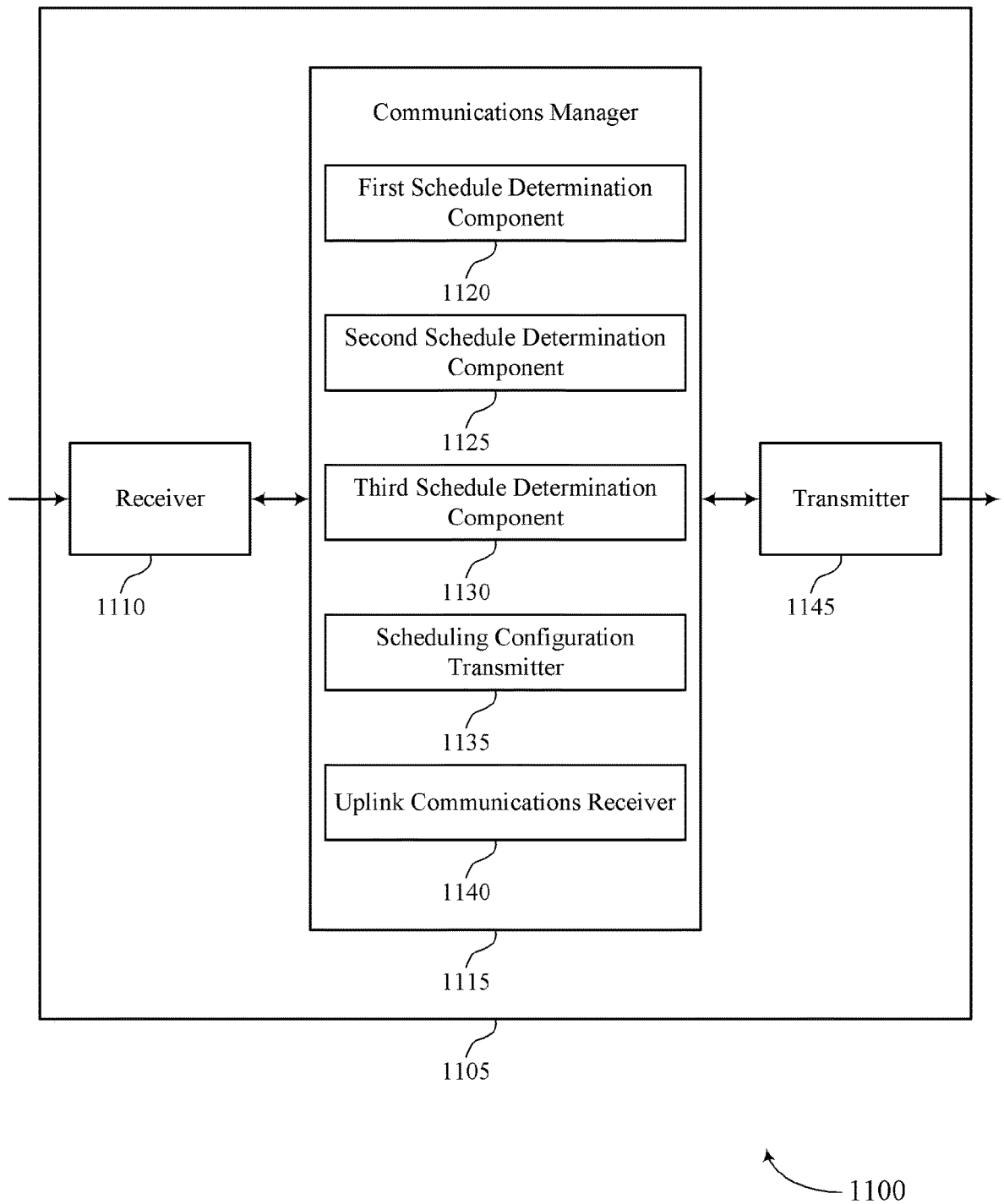

FIG. 11 shows a block diagram 1100 of a device 1105 that supports uplink carrier switching for wireless devices in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink carrier switching for wireless devices, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a first schedule determination component 1120, a second schedule determination component 1125, a third schedule determination component 1130, a scheduling configuration transmitter 1135, and an uplink communications receiver 1140. The communications manager 1115 may be an example of aspects of the communications manager 1310 described herein.

The first schedule determination component 1120 may determine a first uplink communication to be transmitted on a first uplink carrier from a UE. The second schedule determination component 1125 may determine, after the first uplink communication, a second uplink communication to be transmitted on a second uplink carrier.

The third schedule determination component 1130 may determine, after the second uplink communication, a third uplink communication to be transmitted on a third uplink carrier, where a timing relationship between the first uplink communication and the third uplink communication is in accordance with a consecutive uplink switching rule or a UE capability.

The scheduling configuration transmitter 1135 may transmit a scheduling configuration to the UE for at least one of the first, second, or third uplink communications based on the determinations. The uplink communications receiver 1140 may receive at least one of the first, second, or third uplink communications based on the scheduling configuration.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
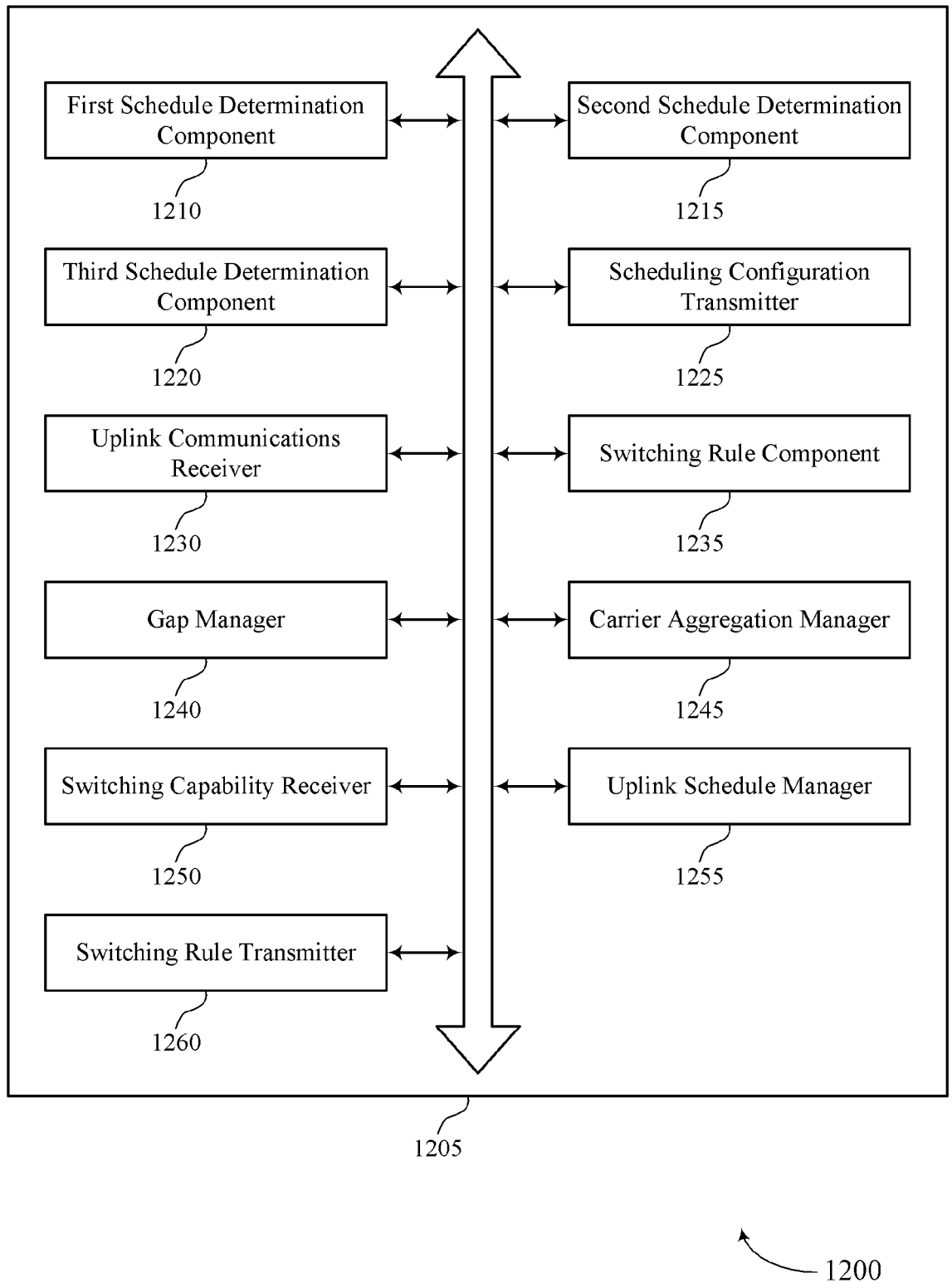
FIG. 12 shows a block diagram of a communications manager that supports uplink carrier switching for wireless devices in accordance with aspects of the present disclosure.

FIG. 12 shows a block diagram 1200 of a communications manager 1205 that supports uplink carrier switching for wireless devices in accordance with aspects of the present disclosure. The communications manager 1205 may be an example of aspects of a communications manager 1015, a communications manager 1115, or a communications manager 1310 described herein. The communications manager 1205 may include a first schedule determination component 1210, a second schedule determination component 1215, a third schedule determination component 1220, a scheduling configuration transmitter 1225, an uplink communications receiver 1230, a switching rule component 1235, a gap manager 1240, a carrier aggregation manager 1245, a switching capability receiver 1250, an uplink schedule manager 1255, and a switching rule transmitter 1260. Each of these modules may communicate, directly or indirectly, with one another (e.g., via one or more buses).

The first schedule determination component 1210 may determine a first uplink communication to be transmitted on a first uplink carrier from a UE. The second schedule determination component 1215 may determine, after the first uplink communication, a second uplink communication to be transmitted on a second uplink carrier. The third schedule determination component 1220 may determine, after the second uplink communication, a third uplink communication to be transmitted on a third uplink carrier, where a timing relationship between the first uplink communication and the third uplink communication is in accordance with a consecutive uplink switching rule or a UE capability. In some cases, the first uplink carrier and the third uplink carrier are a same carrier. The scheduling configuration transmitter 1225 may transmit a scheduling configuration to the UE for at least one of the first, second, or third uplink communications based on the determinations. The uplink communications receiver 1230 may receive at least one of the first, second, or third uplink communications based on the scheduling configuration.

The switching rule component 1235 may identify that the consecutive uplink switching rule limits a number of consecutive uplink switches that occur within a slot of the first uplink carrier, the second uplink carrier, or the third uplink carrier based on a numerology associated with a respective uplink carrier. In some cases, the number of consecutive uplink switches within the slot allowed by the consecutive uplink switching rule is one. In some cases, the consecutive uplink switching rule includes an exception consecutive uplink switching pertaining to transmission of a sounding reference signal communication. In some cases, the consecutive uplink switching rule provides a minimum gap between the first uplink communication and the third uplink communication based on the consecutive uplink switching capability.

The gap manager 1240 may identify that the consecutive uplink switching rule provides a minimum gap between the first uplink communication and the third uplink communication. In some cases, the minimum gap between the first uplink communication and the third uplink communication is dependent on channel type. In some cases, the channel type is associated with the first uplink communication, the second uplink communication, or the third uplink communication. In some cases, the minimum gap corresponds to a first gap when the second uplink communication includes a sounding reference signal. In some cases, the minimum gap corresponds to a second gap when the second uplink communication includes signal other than the sounding reference signal. In some cases, the first gap is less than the second gap. In some cases, the first gap or the second gap is based on a predefined gap configuration, a capability of the UE signaled by the UE, a configuration from the base station, or any combination thereof. In some cases, the minimum gap between the first uplink communication and the third uplink communication is associated with symbols between an end of the first uplink communication and a beginning of the third uplink communication. In some cases, the minimum number of symbols between the first uplink communication and the third uplink communication is associated with symbols between an end of the first uplink communication and a beginning of the third uplink communication.

The carrier aggregation manager 1245 may configure a UE for time division multiplexed uplink carrier aggregation such that the UE switches between an uplink frequency division duplex carrier and a time division duplex carrier for uplink communications. The switching capability receiver 1250 may receive, from the UE, a consecutive uplink switching capability of the UE, where the consecutive uplink switching capability is the UE capability. The uplink schedule manager 1255 may schedule the first uplink communication, the second uplink communication, and the third uplink communication in accordance with the consecutive uplink switching capability. The switching rule transmitter 1260 may transmit an indication of the consecutive uplink switching rule to the UE.

Figure 13:
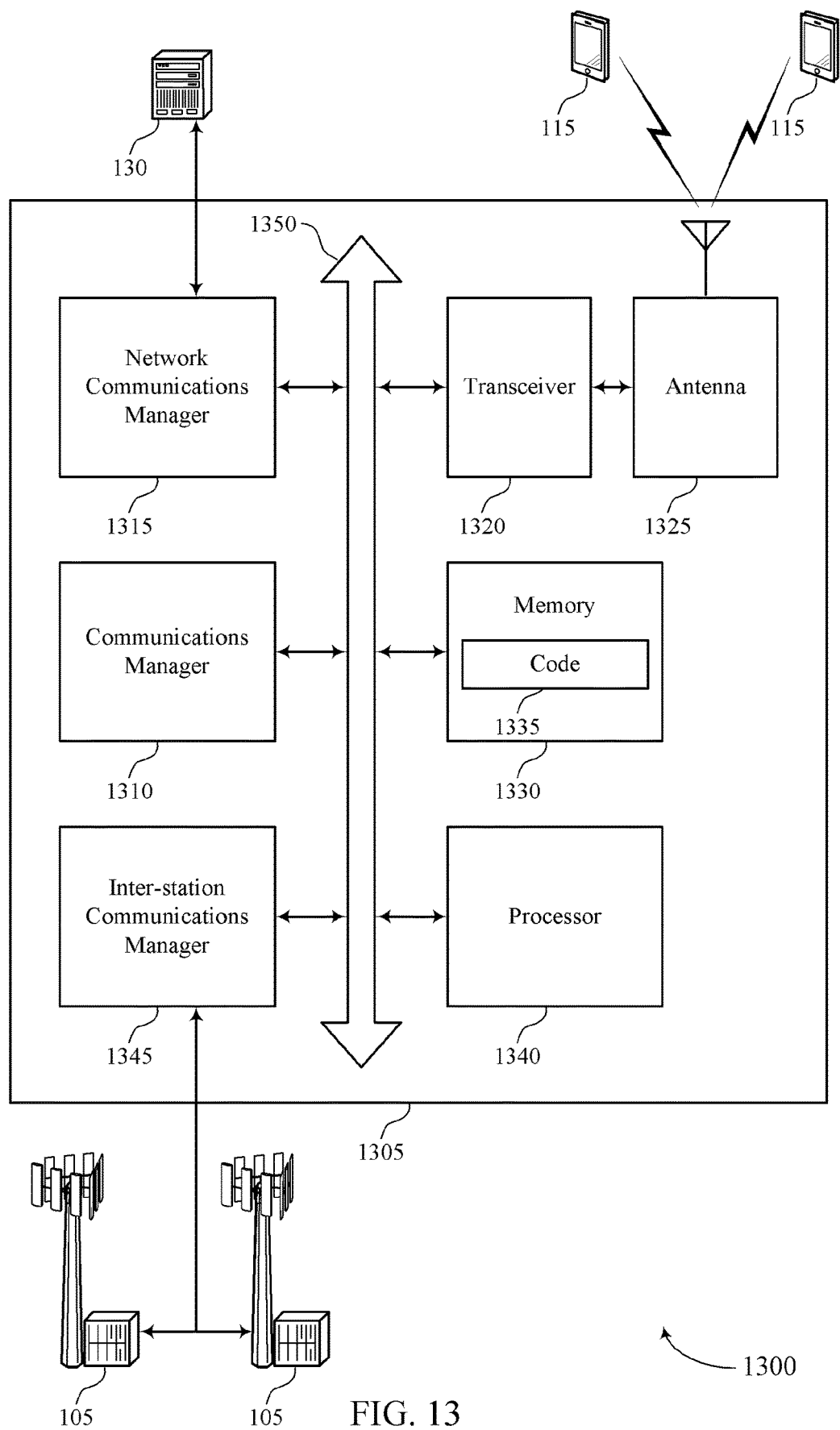
FIG. 13 shows a diagram of a system including a device that supports uplink carrier switching for wireless devices in accordance with aspects of the present disclosure.

FIG. 13 shows a diagram of a system 1300 including a device 1305 that supports uplink carrier switching for wireless devices in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine a first uplink communication to be transmitted on a first uplink carrier from a UE, determine, after the first uplink communication, a second uplink communication to be transmitted on a second uplink carrier, determine, after the second uplink communication, a third uplink communication to be transmitted on a third uplink carrier, where a timing relationship between the first uplink communication and the third uplink communication is in accordance with a consecutive uplink switching rule or a UE capability, transmit a scheduling configuration to the UE for at least one of the first, second, or third uplink communications based on the determinations, and receive at least one of the first, second, or third uplink communications based on the scheduling configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting uplink carrier switching for wireless devices).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
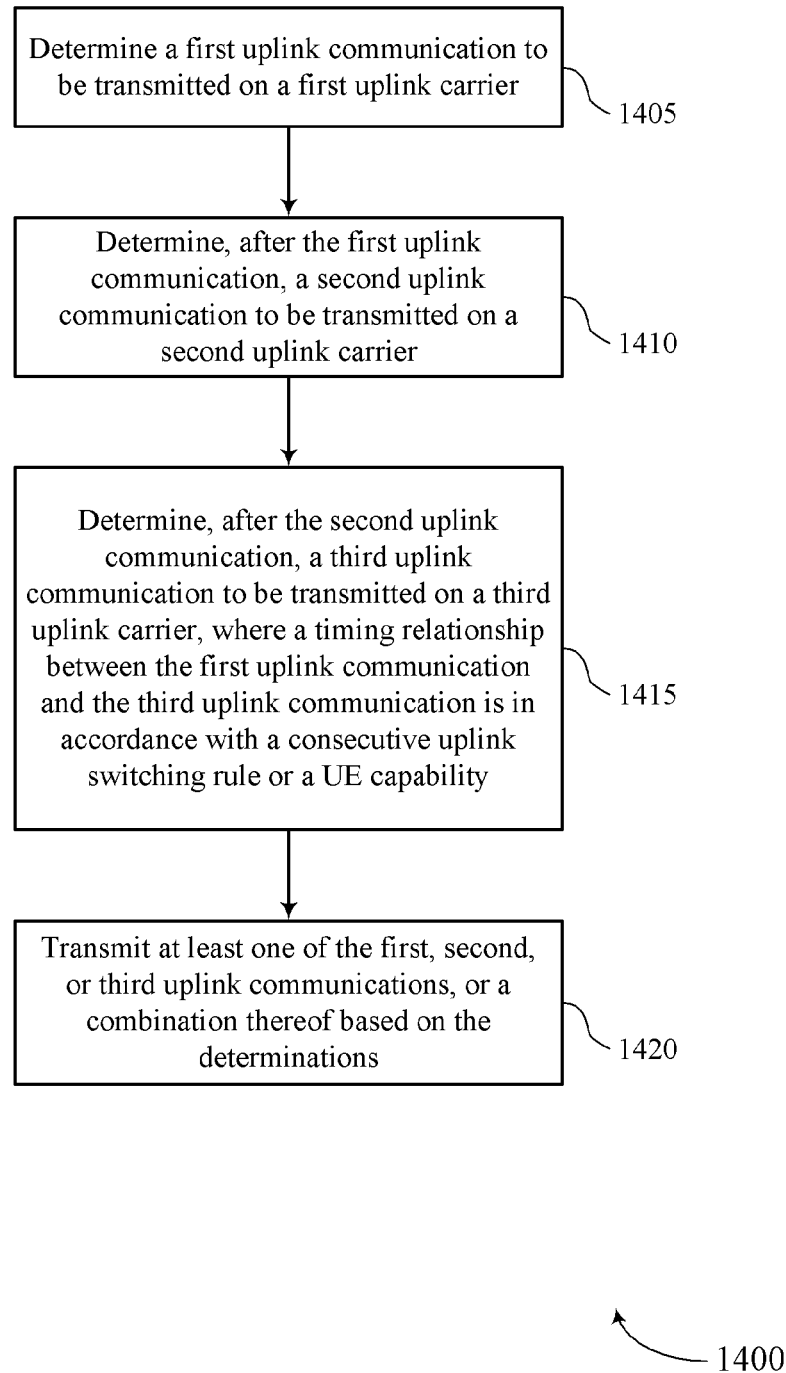
FIGS. 14 through 17 show flowcharts illustrating methods that support uplink carrier switching for wireless devices in accordance with aspects of the present disclosure.

FIG. 14 shows a flowchart illustrating a method 1400 that supports uplink carrier switching for wireless devices in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine a first uplink communication to be transmitted on a first uplink carrier. The operations of 1405 may be performed according to the methods described herein. In some examples, aspects of the operations of 1405 may be performed by a first uplink determination component as described with reference to FIGS. 6 through 9.

At 1410, the UE may determine, after the first uplink communication, a second uplink communication to be transmitted on a second uplink carrier. The operations of 1410 may be performed according to the methods described herein. In some examples, aspects of the operations of 1410 may be performed by a second uplink determination component as described with reference to FIGS. 6 through 9.

At 1415, the UE may determine, after the second uplink communication, a third uplink communication to be transmitted on a third uplink carrier, where a timing relationship between the first uplink communication and the third uplink communication is in accordance with a consecutive uplink switching rule or a UE capability. The operations of 1415 may be performed according to the methods described herein. In some examples, aspects of the operations of 1415 may be performed by a third uplink determination component as described with reference to FIGS. 6 through 9.

At 1420, the UE may transmit at least one of the first, second, or third uplink communications, or a combination thereof based on the determinations. The operations of 1420 may be performed according to the methods described herein. In some examples, aspects of the operations of 1420 may be performed by an uplink communications transmitter as described with reference to FIGS. 6 through 9.

Figure 15:
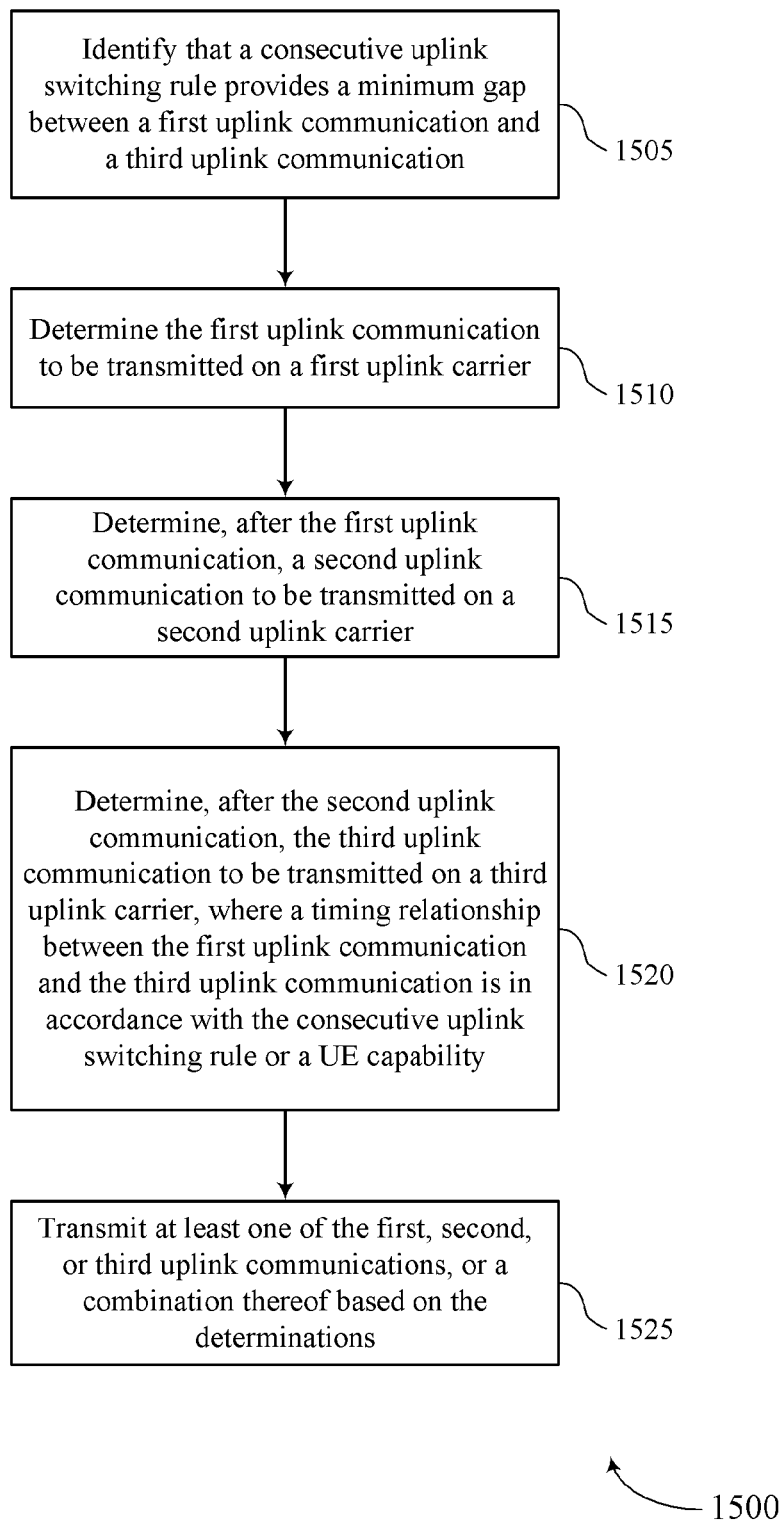

FIG. 15 shows a flowchart illustrating a method 1500 that supports uplink carrier switching for wireless devices in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify that a consecutive uplink switching rule provides a minimum gap between a first uplink communication and a third uplink communication. The operations of 1505 may be performed according to the methods described herein. In some examples, aspects of the operations of 1505 may be performed by a gap component as described with reference to FIGS. 6 through 9.

At 1510, the UE may determine the first uplink communication to be transmitted on a first uplink carrier. The operations of 1510 may be performed according to the methods described herein. In some examples, aspects of the operations of 1510 may be performed by a first uplink determination component as described with reference to FIGS. 6 through 9.

At 1515, the UE may determine, after the first uplink communication, a second uplink communication to be transmitted on a second uplink carrier. The operations of 1515 may be performed according to the methods described herein. In some examples, aspects of the operations of 1515 may be performed by a second uplink determination component as described with reference to FIGS. 6 through 9.

At 1520, the UE may determine, after the second uplink communication, the third uplink communication to be transmitted on a third uplink carrier, where a timing relationship between the first uplink communication and the third uplink communication is in accordance with the consecutive uplink switching rule or a UE capability. The operations of 1520 may be performed according to the methods described herein. In some examples, aspects of the operations of 1520 may be performed by a third uplink determination component as described with reference to FIGS. 6 through 9.

At 1525, the UE may transmit at least one of the first, second, or third uplink communications, or a combination thereof based on the determinations. The operations of 1525 may be performed according to the methods described herein. In some examples, aspects of the operations of 1525 may be performed by an uplink communications transmitter as described with reference to FIGS. 6 through 9.

Figure 16:
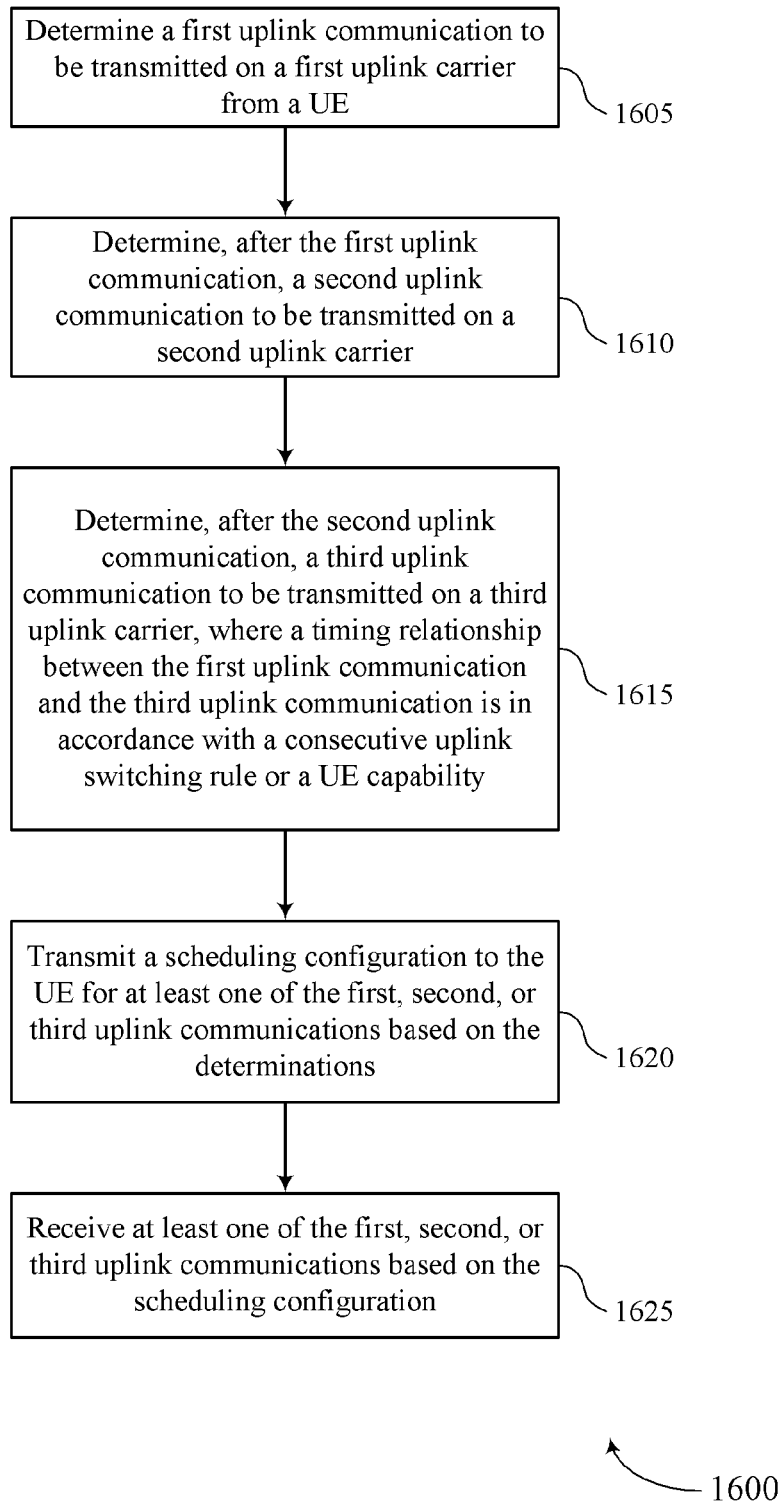

FIG. 16 shows a flowchart illustrating a method 1600 that supports uplink carrier switching for wireless devices in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may determine a first uplink communication to be transmitted on a first uplink carrier from a UE. The operations of 1605 may be performed according to the methods described herein. In some examples, aspects of the operations of 1605 may be performed by a first schedule determination component as described with reference to FIGS. 10 through 13.

At 1610, the base station may determine, after the first uplink communication, a second uplink communication to be transmitted on a second uplink carrier. The operations of 1610 may be performed according to the methods described herein. In some examples, aspects of the operations of 1610 may be performed by a second schedule determination component as described with reference to FIGS. 10 through 13.

At 1615, the base station may determine, after the second uplink communication, a third uplink communication to be transmitted on a third uplink carrier, where a timing relationship between the first uplink communication and the third uplink communication is in accordance with a consecutive uplink switching rule or a UE capability. The operations of 1615 may be performed according to the methods described herein. In some examples, aspects of the operations of 1615 may be performed by a third schedule determination component as described with reference to FIGS. 10 through 13.

At 1620, the base station may transmit a scheduling configuration to the UE for at least one of the first, second, or third uplink communications based on the determinations. The operations of 1620 may be performed according to the methods described herein. In some examples, aspects of the operations of 1620 may be performed by a scheduling configuration transmitter as described with reference to FIGS. 10 through 13.

At 1625, the base station may receive at least one of the first, second, or third uplink communications based on the scheduling configuration. The operations of 1625 may be performed according to the methods described herein. In some examples, aspects of the operations of 1625 may be performed by an uplink communications receiver as described with reference to FIGS. 10 through 13.

Figure 17:
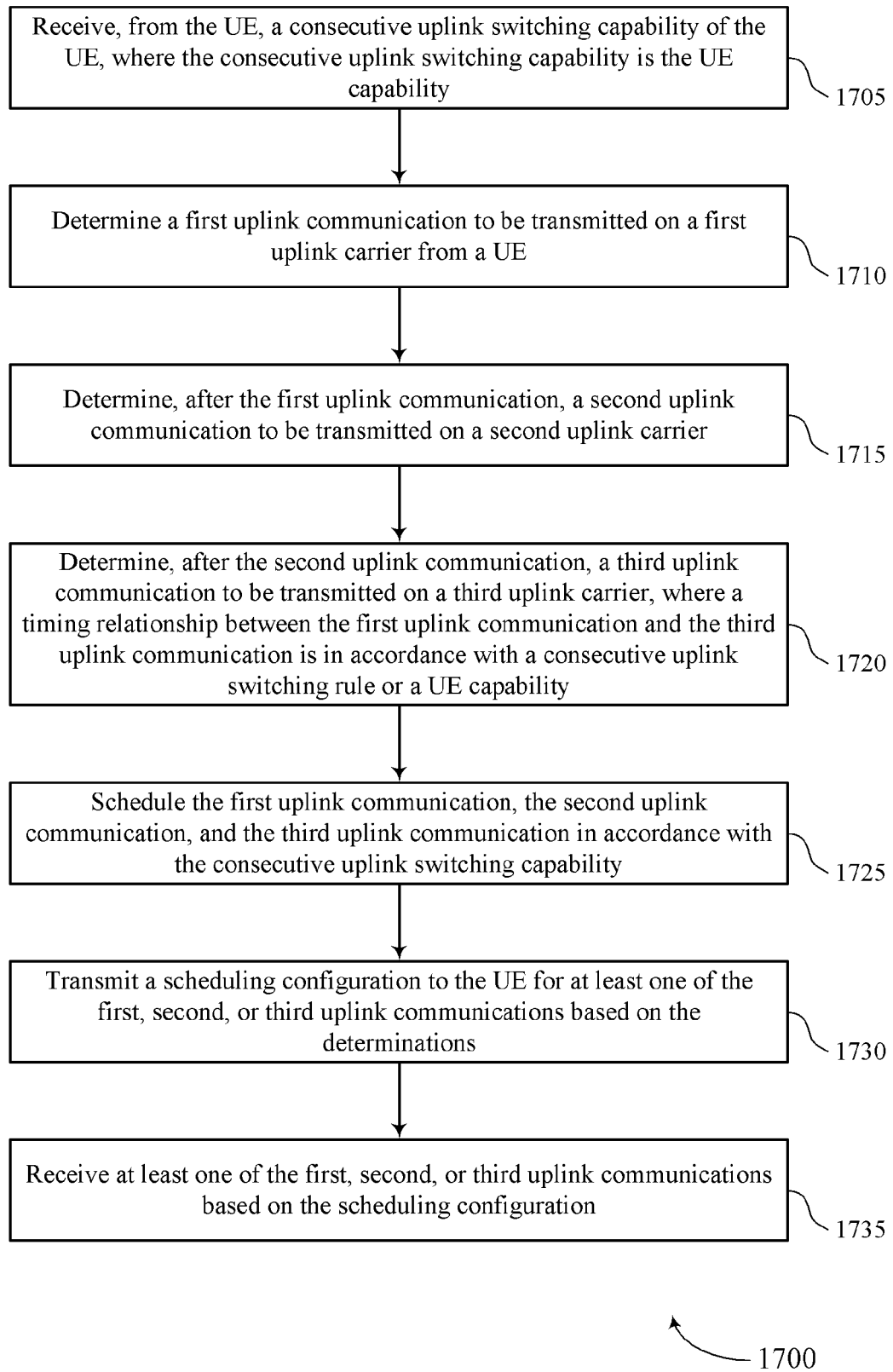

FIG. 17 shows a flowchart illustrating a method 1700 that supports uplink carrier switching for wireless devices in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, from the UE, a consecutive uplink switching capability of the UE, where the consecutive uplink switching capability is the UE capability. The operations of 1705 may be performed according to the methods described herein. In some examples, aspects of the operations of 1705 may be performed by a switching capability receiver as described with reference to FIGS. 10 through 13.

At 1710, the base station may determine a first uplink communication to be transmitted on a first uplink carrier from a UE. The operations of 1710 may be performed according to the methods described herein. In some examples, aspects of the operations of 1710 may be performed by a first schedule determination component as described with reference to FIGS. 10 through 13.

At 1715, the base station may determine, after the first uplink communication, a second uplink communication to be transmitted on a second uplink carrier. The operations of 1715 may be performed according to the methods described herein. In some examples, aspects of the operations of 1715 may be performed by a second schedule determination component as described with reference to FIGS. 10 through 13.

At 1720, the base station may determine, after the second uplink communication, a third uplink communication to be transmitted on a third uplink carrier, where a timing relationship between the first uplink communication and the third uplink communication is in accordance with a consecutive uplink switching rule or a UE capability. The operations of 1720 may be performed according to the methods described herein. In some examples, aspects of the operations of 1720 may be performed by a third schedule determination component as described with reference to FIGS. 10 through 13.

At 1725, the base station may schedule the first uplink communication, the second uplink communication, and the third uplink communication in accordance with the consecutive uplink switching capability. The operations of 1725 may be performed according to the methods described herein. In some examples, aspects of the operations of 1725 may be performed by an uplink schedule manager as described with reference to FIGS. 10 through 13.

At 1730, the base station may transmit a scheduling configuration to the UE for at least one of the first, second, or third uplink communications based on the determinations. The operations of 1730 may be performed according to the methods described herein. In some examples, aspects of the operations of 1730 may be performed by a scheduling configuration transmitter as described with reference to FIGS. 10 through 13.

At 1735, the base station may receive at least one of the first, second, or third uplink communications based on the scheduling configuration. The operations of 1735 may be performed according to the methods described herein. In some examples, aspects of the operations of 1735 may be performed by an uplink communications receiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a scheduling configuration for a first uplink communication to be transmitted on a first uplink carrier, a second uplink communication to be transmitted on a second uplink carrier after the first uplink communication, and a third uplink communication to be transmitted on a third uplink carrier after the second uplink communication, wherein a timing relationship between the first uplink communication and the third uplink communication is in accordance with a consecutive uplink switching rule, and wherein the consecutive uplink switching rule limits a quantity of consecutive uplink switches that occur within a slot of the first uplink carrier, the second uplink carrier, or the third uplink carrier to one; and
   transmitting at least one of the first uplink communication, the second uplink communication, or the third uplink communication, or a combination thereof based at least in part on the scheduling configuration and the consecutive uplink switching rule.

2. The method of claim 1, wherein the consecutive uplink switching rule limits the quantity of consecutive uplink switches that occur within the slot of the first uplink carrier, the second uplink carrier, or the third uplink carrier based at least in part on a numerology associated with a respective uplink carrier.

3. The method of claim 2, wherein the consecutive uplink switching rule includes an exception consecutive uplink switching pertaining to transmission of a sounding reference signal communication.

4. The method of claim 1, wherein the consecutive uplink switching rule provides a minimum gap between the first uplink communication and the third uplink communication.

5. The method of claim 4, wherein the minimum gap between the first uplink communication and the third uplink communication is dependent on channel type.

6. The method of claim 5, wherein the channel type is associated with the first uplink communication, the second uplink communication, or the third uplink communication.

7. The method of claim 4, wherein the minimum gap between the first uplink communication and the third uplink communication is based at least in part on a predefined gap configuration, a capability of the UE, a configuration from a network device, or any combination thereof.

8. The method of claim 4, wherein the minimum gap between the first uplink communication and the third uplink communication is associated with symbols between an end of the first uplink communication and a beginning of the third uplink communication.

9. The method of claim 1, wherein the first uplink carrier and the third uplink carrier are a same carrier.

10. The method of claim 1, further comprising:
transmitting, to a network device, a consecutive uplink switching capability of the UE, wherein the scheduling configuration is in accordance with the consecutive uplink switching capability.

11. The method of claim 10, wherein the consecutive uplink switching rule provides a minimum gap between the first uplink communication and the third uplink communication based at least in part on the consecutive uplink switching capability.

12. A method for wireless communications at a network device, comprising:
transmitting a scheduling configuration for a first uplink communication to be transmitted on a first uplink carrier, a second uplink communication to be transmitted on a second uplink carrier after the first uplink communication, and a third uplink communication to be transmitted on a third uplink carrier after the second uplink communication, wherein a timing relationship between the first uplink communication and the third uplink communication is in accordance with a consecutive uplink switching rule, and wherein the consecutive uplink switching rule limits a quantity of consecutive uplink switches that occur within a slot of the first uplink carrier, the second uplink carrier, or the third uplink carrier to one; and
receiving at least one of the first uplink communication, the second uplink communication, or the third uplink communication based at least in part on the scheduling configuration and the consecutive uplink switching rule.

13. The method of claim 12, wherein the consecutive uplink switching rule limits the quantity of consecutive uplink switches that occur within the slot of the first uplink carrier, the second uplink carrier, or the third uplink carrier based at least in part on a numerology associated with a respective uplink carrier.

14. The method of claim 12, wherein the consecutive uplink switching rule provides a minimum gap between the first uplink communication and the third uplink communication.

15. The method of claim 14, wherein the minimum gap between the first uplink communication and the third uplink communication is dependent on channel type.

16. The method of claim 15, wherein the channel type is associated with the first uplink communication, the second uplink communication, or the third uplink communication.

17. The method of claim 14, wherein the minimum gap between the first uplink communication and the third uplink communication is based at least in part on a predefined gap configuration, a capability of a UE signaled by the UE, a configuration from the network device, or any combination thereof.

18. The method of claim 14, wherein the minimum gap between the first uplink communication and the third uplink communication is associated with symbols between an end of the first uplink communication and a beginning of the third uplink communication.

19. The method of claim 12, wherein the first uplink carrier and the third uplink carrier are a same carrier.

20. The method of claim 12, further comprising:
receiving a consecutive uplink switching capability of a UE; and
scheduling the first uplink communication, the second uplink communication, and the third uplink communication in accordance with the consecutive uplink switching capability.

21. The method of claim 20, wherein the consecutive uplink switching rule provides a minimum gap between the first uplink communication and the third uplink communication based at least in part on the consecutive uplink switching capability.

22. The method of claim 12, further comprising:
transmitting an indication of the consecutive uplink switching rule.

23. An apparatus for wireless communication at a user equipment (UE), comprising:
one or more processors; and
one or more memories coupled with the one or more processors and comprising instructions executable by the one or more processors to cause the apparatus to:
receive a scheduling configuration for a first uplink communication to be transmitted on a first uplink carrier, a second uplink communication to be transmitted on a second uplink carrier after the first uplink communication, and a third uplink communication to be transmitted on a third uplink carrier after the second uplink communication, wherein a timing relationship between the first uplink communication and the third uplink communication is in accordance with a consecutive uplink switching rule, and wherein the consecutive uplink switching rule limits a quantity of consecutive uplink switches that occur within a slot of the first uplink carrier, the second uplink carrier, or the third uplink carrier to one; and
transmit at least one of the first uplink communication, the second uplink communication, or the third uplink communication, or a combination thereof based at least in part on the scheduling configuration and the consecutive uplink switching rule.

24. The apparatus of claim 23, wherein the consecutive uplink switching rule limits the quantity of consecutive uplink switches that occur within the slot of the first uplink carrier, the second uplink carrier, or the third uplink carrier based at least in part on a numerology associated with a respective uplink carrier.

25. The apparatus of claim 23, wherein the instructions are further executable by the one or more processors to cause the apparatus to:
transmit, to a network device, a consecutive uplink switching capability of the UE, wherein the scheduling configuration is in accordance with the consecutive uplink switching capability.

26. The apparatus of claim 25, wherein the consecutive uplink switching rule provides a minimum gap between the first uplink communication and the third uplink communication based at least in part on the consecutive uplink switching capability.

27. An apparatus for wireless communications at a network device, comprising:
one or more processors; and
one or more memories coupled with the one or more processors and comprising instructions executable by the one or more processors to cause the apparatus to:

transmit a scheduling configuration for a first uplink communication to be transmitted on a first uplink carrier, a second uplink communication to be transmitted on a second uplink carrier after the first uplink communication, and a third uplink communication to be transmitted on a third uplink carrier after the second uplink communication, wherein a timing relationship between the first uplink communication and the third uplink communication is in accordance with a consecutive uplink switching rule, and wherein the consecutive uplink switching rule limits a quantity of consecutive uplink switches that occur within a slot of the first uplink carrier, the second uplink carrier, or the third uplink carrier to one; and receive at least one of the first uplink communication, the second uplink communication, or the third uplink communication based at least in part on the scheduling configuration and the consecutive uplink switching rule.

28. The apparatus of claim 27, wherein the consecutive uplink switching rule limits the quantity of consecutive uplink switches that occur within the slot of the first uplink carrier, the second uplink carrier, or the third uplink carrier based at least in part on a numerology associated with a respective uplink carrier.

29. The apparatus of claim 27, wherein the instructions are further executable by the one or more processors to cause the apparatus to:

receive a consecutive uplink switching capability of a UE; and schedule the first uplink communication, the second uplink communication, and the third uplink communication in accordance with the consecutive uplink switching capability.

30. The apparatus of claim 29, wherein the consecutive uplink switching rule provides a minimum gap between the first uplink communication and the third uplink communication based at least in part on the consecutive uplink switching capability.

31. An apparatus for wireless communication at a user equipment (UE), comprising:

means for receiving a scheduling configuration for a first uplink communication to be transmitted on a first uplink carrier, a second uplink communication to be transmitted on a second uplink carrier after the first uplink communication, and a third uplink communication to be transmitted on a third uplink carrier after the second uplink communication, wherein a timing relationship between the first uplink communication and the third uplink communication is in accordance with a consecutive uplink switching rule, and wherein the consecutive uplink switching rule limits a quantity of consecutive uplink switches that occur within a slot of the first uplink carrier, the second uplink carrier, or the third uplink carrier to one; and means for transmitting at least one of the first uplink communication, the second uplink communication, or the third uplink communication, or a combination thereof based at least in part on the scheduling configuration and the consecutive uplink switching rule.

* * * * *